US012559391B2

(12) United States Patent
Taghipour

(10) Patent No.: US 12,559,391 B2
(45) Date of Patent: Feb. 24, 2026

(54) METHOD AND APPARATUS FOR PRODUCING HYDROXYL RADICALS

(71) Applicant: The University of British Columbia, Vancouver (CA)

(72) Inventor: Fariborz Taghipour, Burnaby (CA)

(73) Assignee: The University of British Columbia, Vancouver (CA)

( * ) Notice: Subject to any disclaimer, the term of this patent is extended or adjusted under 35 U.S.C. 154(b) by 834 days.

(21) Appl. No.: 17/389,321

(22) Filed: Jul. 29, 2021

(65) Prior Publication Data

US 2021/0355001 A1 Nov. 18, 2021

Related U.S. Application Data

(63) Continuation of application No. PCT/CA2020/050155, filed on Feb. 6, 2020.

(Continued)

(51) Int. Cl.

*C02F 1/32* (2023.01)
*C02F 1/461* (2023.01)
*C02F 1/467* (2023.01)

(52) U.S. Cl.

CPC .......... *C02F 1/325* (2013.01); *C02F 1/46104* (2013.01); *C02F 1/4672* (2013.01);

(Continued)

(58) Field of Classification Search

CPC ...... C02F 1/32; C02F 1/46; C02F 1/36; C02F 1/72; C02F 1/30

See application file for complete search history.

(56) References Cited

U.S. PATENT DOCUMENTS

2002/0185423 A1* 12/2002 Boyd ...................... C25B 15/00 210/167.3
2007/0068339 A1* 3/2007 York-Leung Wong .. C09K 5/18 252/70

(Continued)

FOREIGN PATENT DOCUMENTS

CA 1338634 C * 10/1996 ............... C25B 1/30
CA 2876242 A1 * 12/2013 ............... C25B 1/04

(Continued)

OTHER PUBLICATIONS

CN-1966421-A Translation (Year: 2007).*

(Continued)

*Primary Examiner* — Clare M Perrin
(74) *Attorney, Agent, or Firm* — Todd A. Rattray; Oyen Wiggs Green & Mutala LLP

(57) ABSTRACT

A method and apparatus for producing hydroxyl radicals in a fluid chamber in an electrochemical cell comprising at least one cathode, at least one anode and at least one source of photolyzing radiation. The method comprises causing an electrochemical cell to produce hydrogen peroxide in the fluid, and causing at least one photolyzing radiation source, such as UV-LED, to photolyze the hydrogen peroxide to produce hydroxyl radicals. The fluid treatment apparatus includes: a structure defining a fluid chamber; at least one cathode facing into the fluid chamber; at least one anode facing into the fluid chamber; and a photolyzing radiation source operable to emit photolyzing radiation into at least one electrochemical cell portion of the fluid chamber, which is suitable for producing hydrogen peroxide.

19 Claims, 23 Drawing Sheets

Related U.S. Application Data

(60) Provisional application No. 62/801,790, filed on Feb. 6, 2019.

(52) U.S. Cl.
CPC ............... *C02F 2001/46138* (2013.01); *C02F 2201/3222* (2013.01); *C02F 2201/328* (2013.01); *C02F 2201/4611* (2013.01); *C02F 2201/46115* (2013.01); *C02F 2303/04* (2013.01); *C02F 2305/023* (2013.01)

(56) References Cited

U.S. PATENT DOCUMENTS

| | | | |
|---|---|---|---|
| 2009/0117442 | A1 | 5/2009 | Eickhoff |
| 2014/0263092 | A1 | 9/2014 | Cano et al. |
| 2016/0222527 | A1 | 8/2016 | Bisselink et al. |

FOREIGN PATENT DOCUMENTS

| | | | | | |
|---|---|---|---|---|---|
| CN | 1754615 | A | * | 4/2006 | |
| CN | 1966421 | A | * | 5/2007 | |
| GB | 2515324 | | | 12/2014 | |
| WO | 2013/082294 | A1 | | 6/2013 | |
| WO | WO-2015013765 | A1 | * | 2/2015 | .............. C25B 1/13 |
| WO | 2017/124190 | A1 | | 7/2017 | |
| WO | 2018/213889 | A1 | | 11/2018 | |

OTHER PUBLICATIONS

CN-1754615-A Translation (Year: 2006).*

Frangos et al., "Improvement of the degradation of pesticide deethylatrazine by combining UV photolysis with electrochemical generation of hydrogen peroxide", Chemical Engineering Journal, Elsevier Amsterdam, NL, vol. 291, Feb. 2, 2016 (Feb. 2, 2016), pp. 215-224, XP029450559, ISSN: 1385-8947, DOI: 10.1016/J.CEJ.2016.01.089.

* cited by examiner

METHOD AND APPARATUS FOR PRODUCING HYDROXYL RADICALS

CROSS-REFERENCE TO RELATED APPLICATIONS

This application is a continuation of Patent Cooperation Treaty (PCT) application No. PCT/CA2020/050155 filed 6 Feb. 2020 which in turn claims the benefit of, and priority to, U.S. provisional patent application No. 62/801,790 filed 6 Feb. 2019. All of the applications referred to in this paragraph are hereby incorporated by reference herein.

FIELD

This disclosure relates generally to fluid treatment.

RELATED ART

Some fluids, such as water for example, may require treatment to deactivate pathogens or degrade chemical contaminants. For example, ultraviolet (UV) radiation or hydroxyl radicals (·OH) may deactivate pathogens or degrade chemical contaminants in water.

SUMMARY

According to one embodiment, there is disclosed a method of producing hydroxyl radicals in a fluid in a fluid chamber in an electrochemical cell comprising at least one cathode and at least one anode, the method comprising: causing the electrochemical cell to produce hydrogen peroxide in the fluid; and causing at least one photolyzing radiation source to emit photolyzing radiation into the fluid chamber in the electrochemical cell such that the photolyzing radiation reacts with the hydrogen peroxide to produce the hydroxyl radicals in the fluid.

According to another embodiment, there is disclosed a cathode assembly for an electrochemical cell, the cathode assembly comprising: a support layer; and at least one cathode on the support layer.

According to another embodiment, there is disclosed a fluid treatment apparatus comprising: a structure defining a fluid chamber; at least one cathode facing into the fluid chamber; at least one anode facing into the fluid chamber; and a photolyzing radiation source operable to emit photolyzing radiation into at least an electrochemical cell portion of the fluid chamber.

According to another embodiment, there is disclosed a cathode assembly for an electrochemical cell, the cathode assembly comprising: a face fabric layer; a breathable and waterproof support layer comprising expanded polytetrafluoroethylene (ePTFE), wherein the support layer is on the face fabric layer; and at least one cathode on the support layer.

Other aspects and features will become apparent to those ordinarily skilled in the art upon review of the following description of illustrative embodiments in conjunction with the accompanying figures.

DETAILED DESCRIPTION

Figure 1:
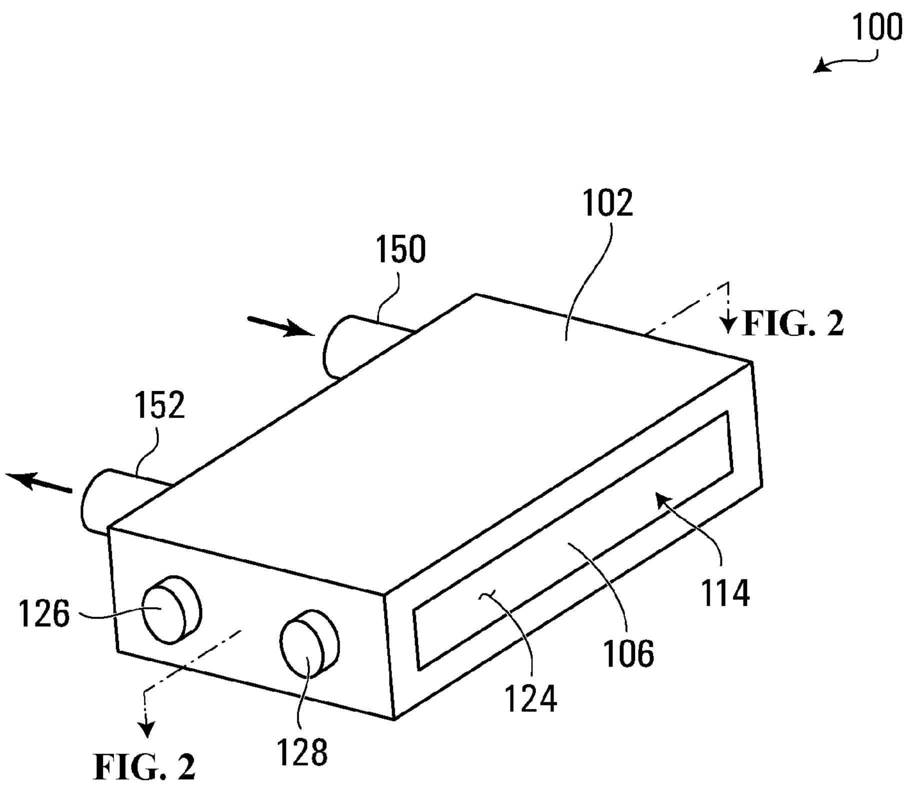
FIG. 1 is a perspective view of a fluid treatment apparatus according to one embodiment.
Figure 2:
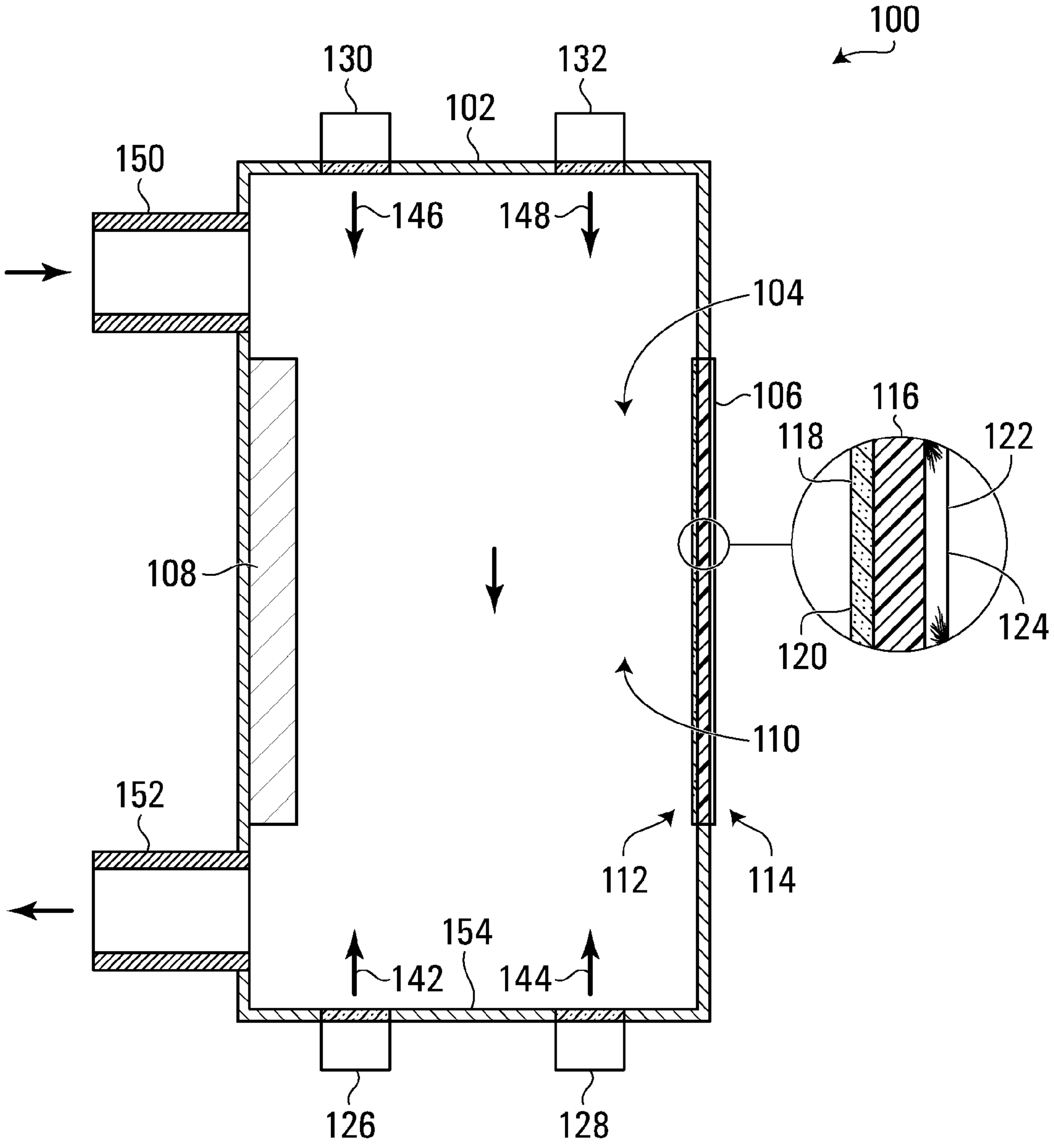
FIG. 2 is a cross-sectional view of the fluid treatment apparatus of FIG. 1, taken along the section line marked FIG. 2 in FIG. 1.

Referring to FIGS. 1 and 2, a fluid treatment apparatus according to one embodiment is shown generally at 100 and includes a photoelectrochemical reactor 102. The photoelectrochemical reactor 102 includes an electrochemical cell structure shown generally at 104 and including a cathode assembly 106, an anode 108, and structure defining a fluid chamber shown generally at 110.

Figure 3:
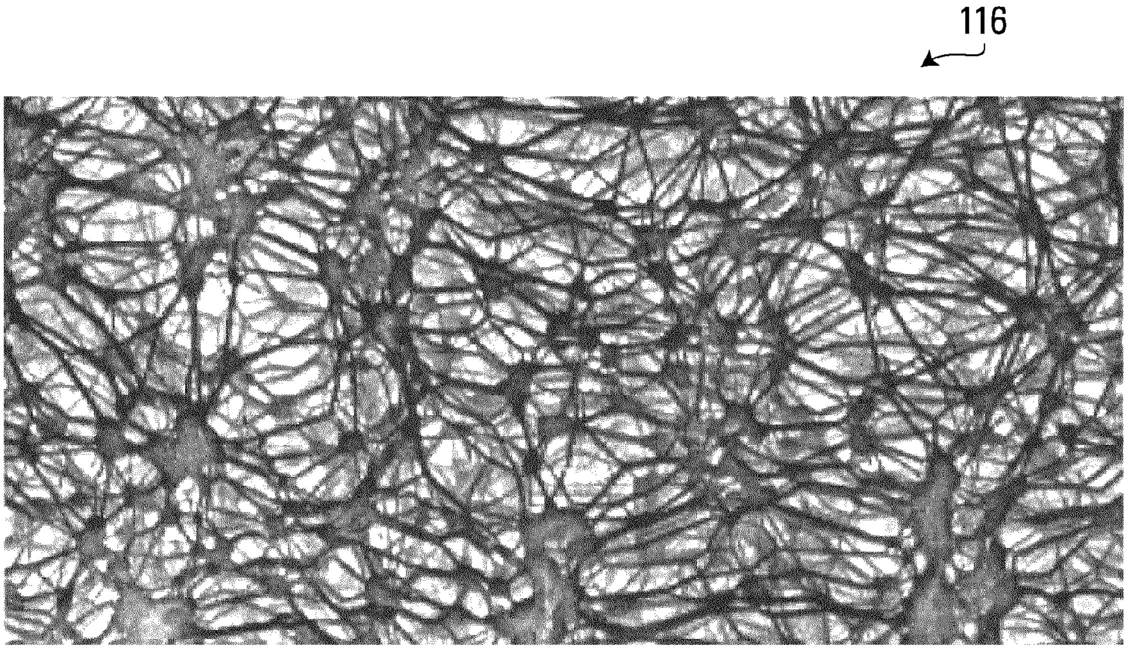
FIG. 3 illustrates a support layer of a cathode assembly of the fluid treatment apparatus of FIG. 1.

Referring to FIG. 2, the cathode assembly 106 has an internal side shown generally at 112 and an external side shown generally at 114 and opposite the internal side 112. The cathode assembly 106 includes a support layer 116. In the embodiment shown, the support layer 116 includes expanded polytetrafluoroethylene (ePTFE), as shown in FIG. 3 for example. A layer of ePTFE, as shown in FIG. 3 for example, may be waterproof but may also permit diffusion of gases through the layer, so the support layer 116 may be impermeable to a fluid, such as water (and may therefore be waterproof) for example, and may also be breathable, although alternative embodiments may differ. For example, the support layer of alternative embodiments may include other polymers or other materials that may be impermeable to one or more fluids (such as one or more liquids) and that may be breathable.

The cathode assembly 106 also includes a cathode 118 on the internal side 112 of the support layer 116. In some embodiments, the cathode 118 may be sprayed onto the support layer 116, laminated onto the support layer 116 using a binder, or otherwise connected to or coated on the support layer 116 by a chemical bonding (such as by chemical bond, including covalent or non-covalent interactions, for example) or by a physical means, for example. In some embodiments, the cathode 118 may include carbon black, carbon fiber paper, graphite, graphene, reduced graphene oxide (RGO), polytetrafluoroethylene (PTFE), another hydrophobic material (which may or may not be conductive), or a combination of two or more thereof, for example. As one example, a hydrophobic material (which may or may not be conductive) may be mixed with a carbon catalyst such as carbon fiber. In some embodiments, the cathode 118 may have a three-dimensional structure, such as a foam-shaped electrode, a foam-structure electrode, or a cellular electrode, for example. A foam-shaped electrode, a foam-structure electrode, or a cellular electrode may include a polymer-foam structure or a metal-foam structure, for example. For example, the cathode 118 may include or consist of a metal foam coated with carbon. In some embodiments, such a foam-structure electrode, such a cellular electrode, such a polymer-foam structure, or such a metal-foam structure may enhance electrochemical production or conversion of chemicals by providing a relatively high reaction surface area and a relatively improved mass transfer of reactants and products to the reaction surface. For example, a thin three-dimensional cathode structure (which may be carbon coated on a metal foam, for example) may, in some embodiments, enhance production of hydrogen peroxide ($H_2O_2$). The cathode 118 may function as a catalyst, and may therefore be referred to as a cathodic catalyst. Because the cathode 118 is on the internal side 112 of the support layer 116, the fluid chamber 110 may be exposed to the cathode 118 on a first surface 120 of the cathode assembly 106 and on the cathode 118, and the cathode 118 faces into the fluid chamber 110. Therefore, at least a portion of the fluid chamber 110 is between the anode 108 and the cathode 118.

Although the cathode 118 is on the internal side 112 of the support layer 116 in the embodiment shown, alternative embodiments may differ. For example, in some embodiments, a cathode (such as a carbon cathode, for example) may be embedded into a support layer (such as a support layer of ePTFE, for example), such a support layer may be embedded into such a cathode, or such a cathode and such a support layer may otherwise connected to each other.

The cathode assembly 106 also includes a face fabric layer 122 on the external side 114 of the support layer 116. In some embodiments, the face fabric layer may include nylon or polyester, for example, and the face fabric layer 122 may have a tensile strength of at least about 0.275 megapascals (MPa), or at least about 0.55 MPa, for example. Such tensile strength may be appropriate to resist a pressure of a fluid in the fluid chamber 110 at a typical pressure of tap water, for example. Of course, the face fabric 122 may have a higher tensile strength, such as about 45 MPa to about 55 MPa if the face fabric layer 122 includes nylon or polyester, for example. Because the face fabric layer 122 is on the external side 114 of the support layer 116, a second surface 124 of the cathode assembly 106 opposite the first surface 120 and on the face fabric 122 may be exposed to an environment external to the photoelectrochemical reactor 102, such as atmospheric air or another source of oxygen, for example.

In some embodiments, the support layer 116 and the face fabric layer 122 may be from a GORE-TEX™ material or a similar waterproof or breathable material having a face fabric. Therefore, in some embodiments, the cathode assembly 106 may be formed by applying the cathode 118 to the internal side 112 of the support layer 116 of a GORE-TEX™ material or a similar waterproof or breathable material. However, alternative embodiments may differ.

The anode 108 in the embodiment of FIGS. 1 and 2 faces into the fluid chamber 110, faces the cathode 118, and may be a perforated electrode (such as a mesh electrode or a porous electrode, for example), or a solid electrode. For example, the anode 108 may include or consist of a metal or metal-alloy mesh, or the anode 108 may have a three-dimensional structure, such as a foam-shaped electrode, a foam-structure electrode, or a cellular electrode, for example. A foam-shaped electrode, a foam-structure electrode, or a cellular electrode may include a polymer-foam structure or a metal-foam structure, for example. In some embodiments, such a foam-structure electrode, such a cellular electrode, such a polymer-foam structure, or such a metal-foam structure may enhance electrochemical production or conversion of chemicals by providing a relatively high reaction surface area and a relatively improved mass transfer of reactants and products to the reaction surface. Alternatively or additionally, the anode 108 may include one or more metal oxides, metal nitrides, or metal oxynitrides. As a more specific example, the anode 108 may include or consist of porous or mesh titanium coated with an iridium mixed-metal oxide. Alternatively, the anode 108 may include a mesh that may be coated with a different metal oxide, such as tungsten trioxide ($WO_3$), bismuth vanadate ($BiVO_4$), tin(IV) oxide ($SnO_2$), titanium dioxide ($TiO_2$), or a combination of two or more thereof.

Figure 4:
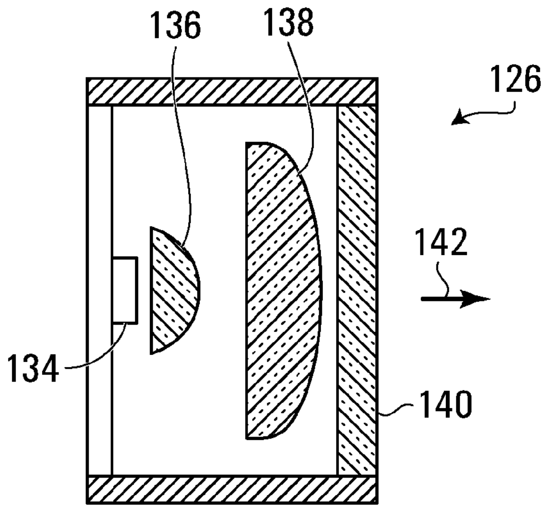
FIG. 4 is a cross-sectional view of a UV-LED assembly of the fluid treatment apparatus of FIG. 1.

Referring to FIGS. 1 and 2, the photoelectrochemical reactor 102 includes UV light-emitting diode (UV-LED) assemblies 126, 128, 130, and 132. Referring to FIG. 4, the UV-LED assembly 126 is shown generally and includes a UV-LED 134, a first lens 146, a second lens 148, and a UV-transparent window 140. In the embodiment shown, the first lens 136 is a converging lens and positioned to converge UV radiation emitted from the UV-LED 134, and the second lens 138 is a collimating lens positioned to collimate (or to collimate substantially) UV radiation from the first lens 136. Therefore, in the embodiment shown, the UV-LED assembly 126 is configured to cause collimated (or substantially collimated) UV radiation to be transmitted through the UV-transparent window 140. However, alternative embodiments may differ. For example, although the embodiment shown includes a UV-LED 134, alternative embodiments may include other solid-state UV emitters or other sources of UV radiation. Further, although the embodiment shown includes the first and second lenses 136 and 138, alternative embodiments may include one or more other radiation-refracting bodies (such as a cup-shaped reflector, such as a parabolic reflector or an elliptical reflector, for example, to redirect at least part of the UV radiation to the fluid chamber), one or more radiation-reflecting bodies, or both, or alternative embodiments may omit one or both the first and second lenses 136 and 138. Further, although the embodiment shown includes a UV-LED 134, alternative embodiments may include sources of other radiation. In such embodiments, any radiation-reflecting, radiation-refracting, or radiation-transparent bodies as described herein may reflect, refract, or be transparent to radiation of such other one or more radiation sources.

Referring back to FIGS. 1 and 2, the UV-LEDs of the UV-LED assemblies 126, 128, 130, and 132 may emit UV radiation having different peak wavelengths. For example, the UV-LEDs of the UV-LED assemblies 126 and 128 may emit UV radiation having a first peak wavelength, and the UV-LEDs of the UV-LED assemblies 130 and 132 may emit UV radiation having a second peak wavelength different from the first peak wavelength. In some embodiments, different peak wavelengths may be used to cause synergistic effects to enhance photoreaction or photo-initiated reaction efficiency.

As shown in FIG. 2, the UV-LEDs of the UV-LED assemblies 126, 128, 130, and 132 are positioned to emit UV radiation in directions 142, 144, 146, and 148 respectively. In the embodiment shown, the directions 142, 144, 146 and 148 are into the fluid chamber 110. Additionally, one or more internal walls of the structure defining the fluid chamber 110, such as the internal wall 154, may be made of or coated with a material having a high UV reflectivity. Thus, one or more of the internal walls of the structure defining the fluid chamber 110 may reflect into the fluid chamber 110 some or all of any UV radiation that is directed to them.

Referring to FIGS. 1 and 2, the photoelectrochemical reactor 102 includes a fluid inlet 150 and a fluid outlet 152, and the fluid inlet 150 and the fluid outlet 152 are in fluid communication with the fluid chamber 110. Therefore, a fluid (such as water, for example) that enters the photoelectrochemical reactor 102 through the fluid inlet 150 may flow from the fluid inlet 150 through the fluid chamber 110, and out of the photoelectrochemical reactor 102 through the fluid outlet 152.

When a fluid is in the fluid chamber 110, for example when flowing from the fluid inlet 150 to the fluid outlet 152, the fluid may be exposed to both the cathode 118 and the anode 108. The photoelectrochemical reactor 102 and the fluid may thus function as an electrochemical cell, and a portion of the fluid chamber 110 that is exposed to the cathode 118 and to the anode 108 (or a portion of the fluid chamber 110 that the cathode 118 and the anode 108 face into, or a portion of the fluid chamber 110 between the anode 108 and the cathode 118) may be an electrochemical cell portion of the fluid chamber 110. In such an electrochemical cell, an electric potential between the cathode 118 and the anode 108 may cause a reduction half-reaction at the cathode 118 and an oxidation half-reaction at the anode 108. For example, if the fluid is water, the reduction half-reaction at the cathode 118 may consume protons ($H^+$), oxygen ($O_2$), and electrons ($e^-$) to produce $H_2O_2$ according to $$2H^+ + O_2 + 2e^- \rightarrow H_2O_2,$$

and the oxidation half-reaction at the anode 108 may consume water ($H_2O$) to produce $H^+$, $O_2$, and $e^-$ according to $$H_2O \rightarrow 2H^+ + \tfrac{1}{2}O_2 + 2e^-.$$

The $O_2$ required for the reduction half-reaction at the cathode 118 may be at least partly obtained from an environment external to the photoelectrochemical reactor 102 by passing through the face fabric layer 122 and the support layer 116, for example. The cathode assembly may thus function as a gas diffusion electrode or as a gas diffusion cathode.

Additionally, when the fluid is exposed to the cathode 118 and to the anode 108, or when the fluid is in an electrochemical cell portion of the fluid chamber 110 (which, as indicated above, may be a portion of the fluid chamber 110 that is exposed to the cathode 118 and to the anode 108, or a portion of the fluid chamber 110 that the cathode 118 and the anode 108 face into, or a portion of the fluid chamber 110 between the anode 108 and the cathode 118), the fluid may also be exposed to UV radiation from the UV-LED assemblies 126, 128, 130, and 132. In some embodiments, substantially all of at least a portion of the fluid chamber 110 between the anode 108 and the cathode 118 may be exposed to UV radiation from one or more of the UV-LED assemblies 126, 128, 130, and 132. Such UV radiation may initiate chemical reactions, photochemical reactions, or both in the fluid. For example, if the fluid is untreated water containing chemical, organic, or microbial contaminants, the UV radiation may directly react with and decompose some of these contaminants. If, for example, $H_2O_2$ is present in the water, having been produced for example by the reduction half-reaction described above, then such UV radiation may react with the $H_2O_2$ to produce hydroxyl radicals (·OH) by the photoreaction $$H_2O_2 \xrightarrow{UV} 2{\cdot}OH,$$

for example. The ·OH radicals may then react with and decompose some or all of the contaminants in the water.

Because the UV radiation from the UV-LEDs of the UV-LED assemblies 126, 128, 130, and 132 may react with $H_2O_2$ to produce ·OH radicals by photoreaction, the UV radiation photolyzes the $H_2O_2$, and the UV radiation may be referred to as photolyzing radiation. In general, photolyzing radiation herein may refer to UV radiation or to other radiation that may cause reactions such as production of ·OH radicals from $H_2O_2$ or other photolytic reactions, and alternatives to the UV-LED assemblies 126, 128, 130, and 132 may include one or more different sources of such photolyzing radiation. In some embodiments, photolyzing radiation having one or more wavelengths between about 200 nanometers (nm) and about 280 nm for example may be suitable for producing ·OH radicals from $H_2O_2$ by photoreaction, and photolyzing radiation having one or more wavelengths between about 220 nm and about 370 nm for example may be suitable for producing ·OH radicals from $H_2O_2$ by photoreaction with a UV photocatalyst such as $TiO_2$.

Of course, the embodiment of FIGS. 1 and 2 is an example only, and alternative embodiments may vary. For example, alternative embodiments may include more or fewer UV-LED assemblies, one or more UV-LED assemblies in positions that differ from the positions shown in FIGS. 1 and 2, or one or more alternatives to the UV-LED assemblies 126, 128, 130, and 132. Further, in alternative embodiments, the fluid inlet and the fluid outlet may be in different positions.

Figure 5:
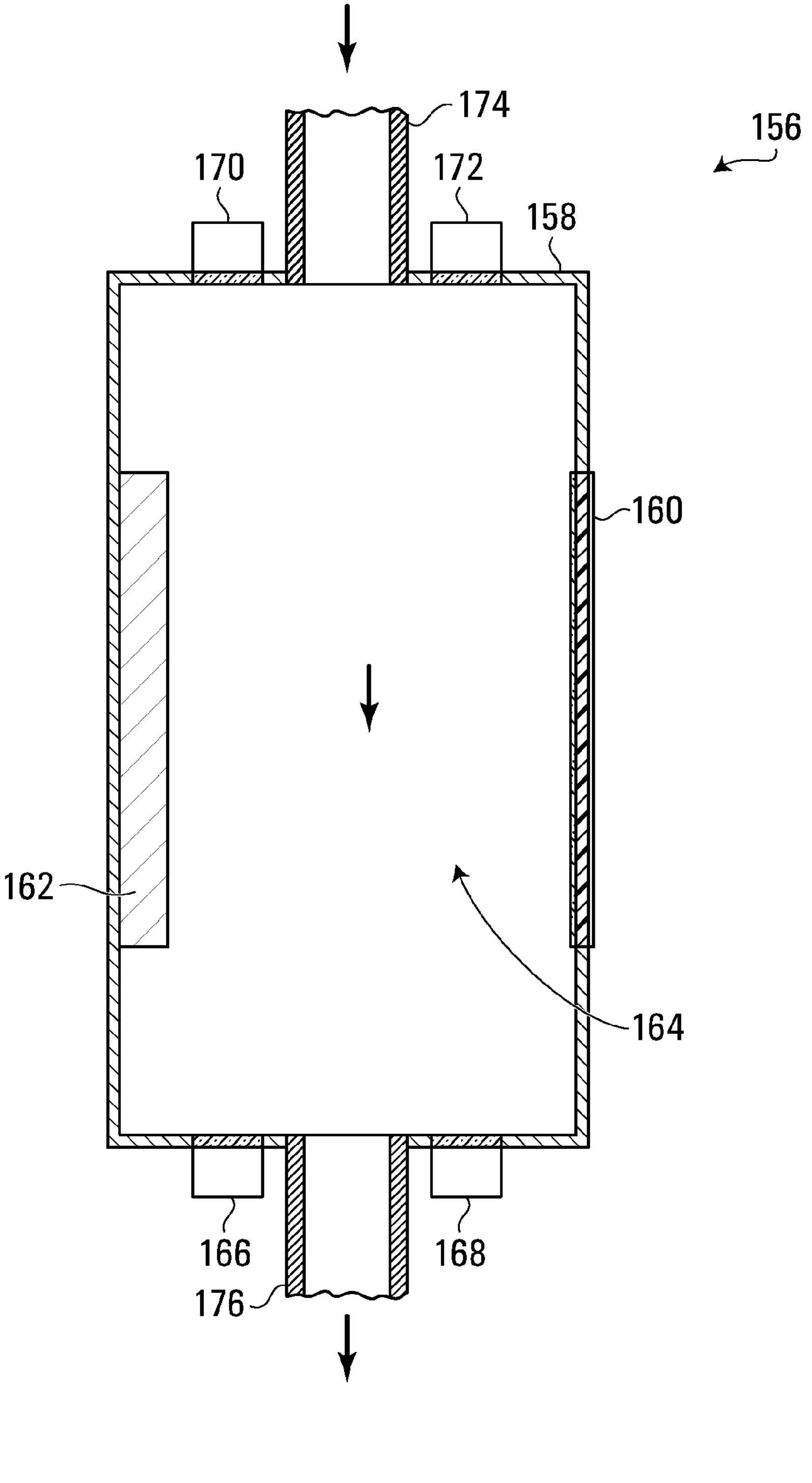
FIG. 5 is a cross-sectional view of a fluid treatment apparatus according to another embodiment.

For example, referring to FIG. 5, a fluid treatment apparatus according to another embodiment is shown generally at 156 and includes a photoelectrochemical reactor 158 including a cathode assembly 160, an anode 162, a structure defining a fluid chamber shown generally at 164, and UV-LED assemblies 166, 168, 170, and 172. The cathode assembly 160, the anode 162, and the UV-LED assemblies 166, 168, 170, and 172 may be similar to the cathode assembly 106, the anode 108, and the UV-LED assemblies 126, 128, 130, and 132 respectively as described above. The photoelectrochemical reactor 158 also includes a fluid inlet 174 and a fluid outlet 176, both in fluid communication with the fluid chamber 164. However, as shown in FIG. 5, the fluid inlet 174 and the fluid outlet 176 may be positioned at opposite longitudinal ends of the photoelectrochemical reactor 158.

In other examples, a fluid inlet, a fluid outlet, or both may have still other positions that differ from those shown in FIGS. 1-5. For example, in some embodiments, a fluid inlet may be on a top side of a photoelectrochemical reactor, and a fluid outlet may be on a bottom side opposite the top side of the photoelectrochemical reactor. In other embodiments, a fluid outlet may be on a top side of a photoelectrochemical reactor, and a fluid inlet may be on a bottom side opposite the top side of the photoelectrochemical reactor.

Also, in other examples, an anode and a cathode assembly may have other positions that differ from those shown in FIGS. 1 and 2, and an anode and a cathode assembly may have a shape, a size, or both that differ from those shown in FIGS. 1 and 2. For example, in some embodiments, an anode, a cathode assembly, or both may be expanded to other parts of a photoelectrochemical reactor. Also, in some embodiments, an anode may be on a top side or on a bottom side opposite the top side of a fluid chamber, and a cathode assembly may be on the top side or on the bottom side of a fluid chamber.

Also, in alternative embodiments, other components may be added.

Figure 6:
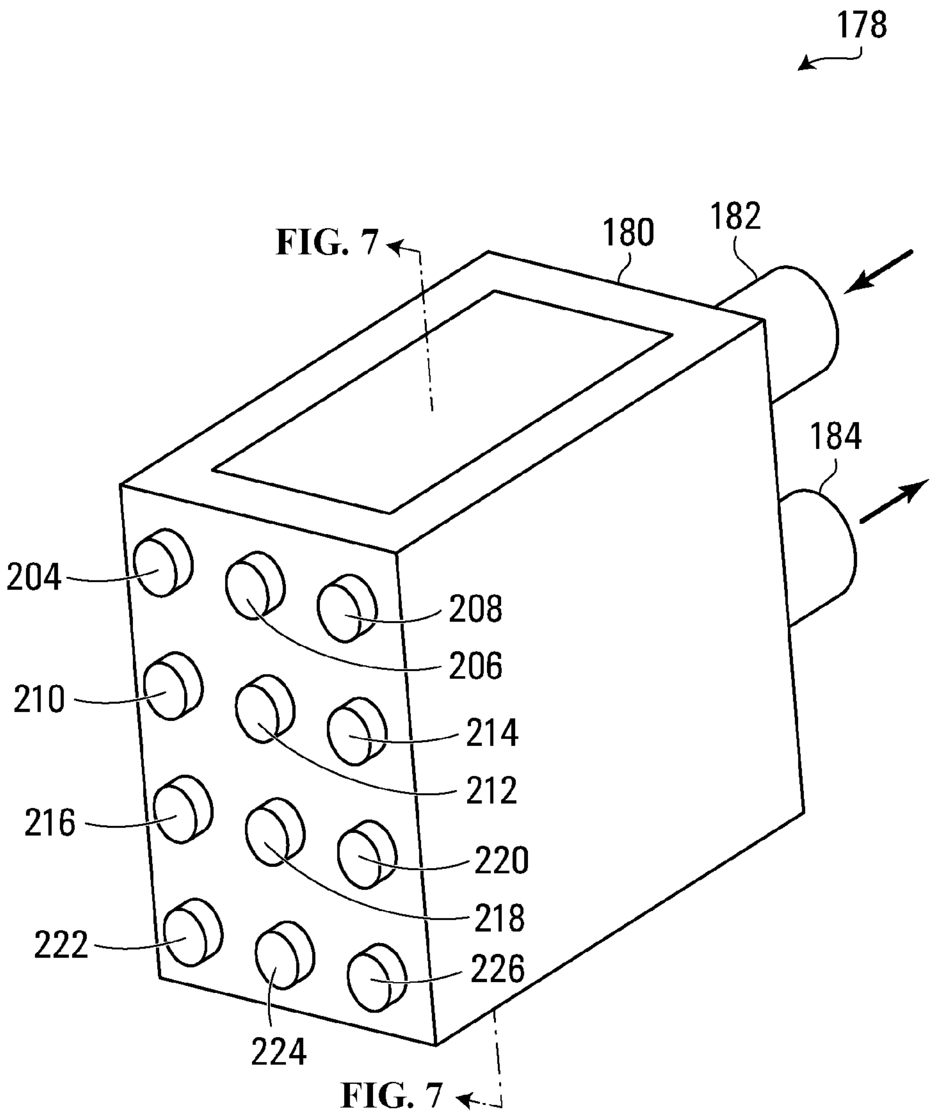
FIG. 6 is a perspective view of a fluid treatment apparatus according to another embodiment.
Figure 7:
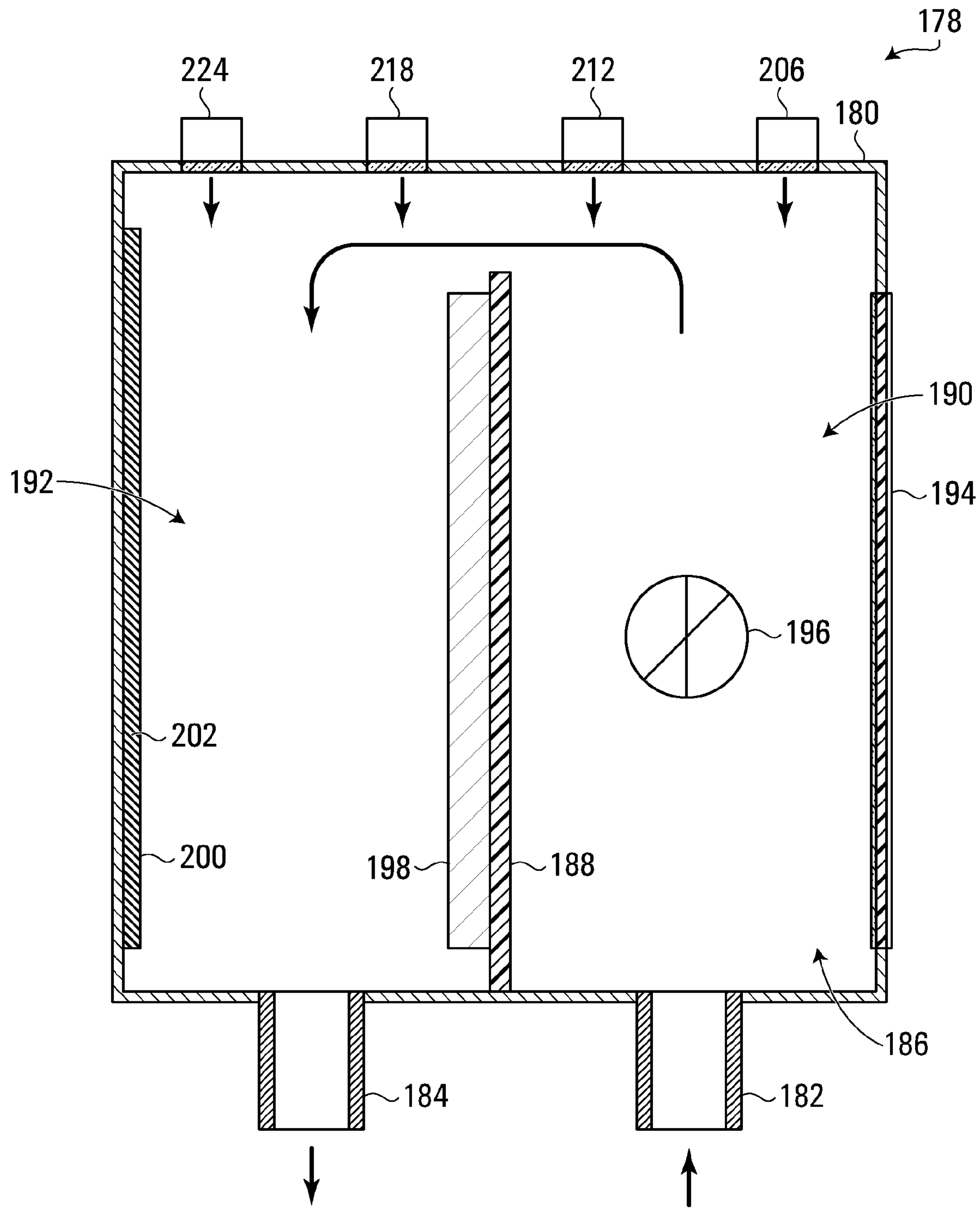
FIG. 7 is a cross-sectional view of the fluid treatment apparatus of FIG. 6, taken along the section line marked FIG. 7 in FIG. 6.

For example, some embodiments may include an ion exchange membrane or a bipolar membrane. Referring to FIGS. 6 and 7, for example, a fluid treatment apparatus according to another embodiment is shown generally at 178 and includes a photoelectrochemical reactor 180. The photoelectrochemical reactor 180 includes a fluid inlet 182 and a fluid outlet 184, both in fluid communication with a fluid chamber shown generally at 186. However, in the embodiment shown, the photoelectrochemical reactor 180 includes a fluid chamber divider 188 separating the fluid chamber 186 into a cathode chamber shown generally at 190 and an anode chamber shown generally at 192. In the embodiment shown, the fluid inlet 182 is in fluid communication with the cathode chamber 190, the cathode chamber 190 is in fluid communication with the anode chamber 192, and the anode chamber 192 is in fluid communication with the fluid outlet 184, such that fluid that enters the photoelectrochemical reactor 180 from the fluid inlet 182 may flow from the fluid inlet 182 to the cathode chamber 190, and then to the anode chamber 192, and may then exit the photoelectrochemical reactor 180 through the fluid outlet 184.

Fluid in the cathode chamber 190 may be exposed to a cathode of a cathode assembly 194, which may be the same as the cathode assembly 106 shown in FIGS. 1 and 2, and the cathode of the cathode assembly 194 faces into the cathode chamber 190. The cathode chamber 190 may thus be an electrochemical cell portion of the fluid chamber 186. Also, in the cathode chamber 190, the photoelectrochemical reactor 180 includes a static mixer 196, although alternative embodiments may include one or more dynamic or static mixers at other locations, or may omit the static mixer 196.

In the anode chamber 192, the photoelectrochemical reactor 180 also includes an anode 198, which may be similar to the anode 108 shown in FIG. 2, so that fluid in the anode chamber 192 may be exposed to the anode 198, and the anode 198 faces into the anode chamber 192. The anode chamber 192 may also thus be an electrochemical cell portion of the fluid chamber 186. Also in the anode chamber 192, the photoelectrochemical reactor 180 includes a photocatalyst 200 immobilized on a support structure 202, so that fluid in the anode chamber 192 may be exposed to the photocatalyst 200. The photocatalyst may be titanium dioxide, for example.

In the embodiment of FIGS. 6 and 7, the cathode chamber 190 is adjacent the adjacent anode chamber 192, and the fluid chamber divider 188 may function as a selectively permeable membrane. For example, the fluid chamber divider 188 may be an ion exchange membrane, such as a cation exchange membrane. As a more specific example, the fluid chamber divider 188 may be a proton ($H^+$) exchange membrane. As another example, the fluid chamber divider 188 may be a bipolar membrane that may allow both anions and cations to pass through the chamber divider 188. As such, the fluid chamber divider 188 may selectively allow $H^+$ produced by an oxidation half-reaction at the anode 198 to cross from the anode chamber 192 to the cathode chamber 190, where the $H^+$ may be consumed in a reduction half reaction at the cathode of the cathode assembly 194.

In some embodiments, such a proton exchange membrane may allow $H^+$ to be transferred away from the anode 198 while reducing or avoiding some chemicals (such as $H_2O_2$, for example) reaching the anode 198. If any $H_2O_2$ reaches the anode 198 prematurely, then production of ·OH radicals may be reduced, and reactions of ·OH radicals with contaminants may be reduced.

The fluid chamber divider 188 is an example of an ion-conductive material that may facilitate ion conduction between the cathode chamber 190 and the anode chamber 192, but alternative embodiments may include one or more other ion-conductive materials. For example, alternative embodiments may include an ion-conductive electrolyte, in a membrane or in a salt bridge for example, to facilitate ion conduction between a cathode chamber and an anode chamber.

As shown in FIGS. 6 and 7, the photoelectrochemical reactor 180 includes UV-LED assemblies 204, 206, 208, 210, 212, 214, 216, 218, 220, 222, 224, and 226, which may be similar to the UV-LED assembly 126 as described above, or which may be other sources of radiation such as other photolyzing radiation, for example. Fluid in the cathode chamber 190 may be exposed to radiation from the UV-LEDs of the UV-LED assemblies 204, 206, 208, 210, 212, and 214, and fluid in the anode chamber 192 may be exposed to radiation from the UV-LEDs of the UV-LED assemblies 216, 218, 220, 222, 224, and 226. The UV-LED assemblies of the photoelectrochemical reactor 180 may be collectively described as an array.

At least a portion of the cathode chamber 190 and at least a portion of the anode chamber 192 are between the cathode of the cathode assembly 194 and the anode 198. In some embodiments, substantially all of the at least a portion of the cathode chamber 190 and the at least a portion of the anode chamber 192 between the cathode of the cathode assembly 194 and the anode 198 may be exposed to UV radiation from one or more of the UV-LED assemblies 216, 218, 220, 222, 224, and 226.

Figure 8:
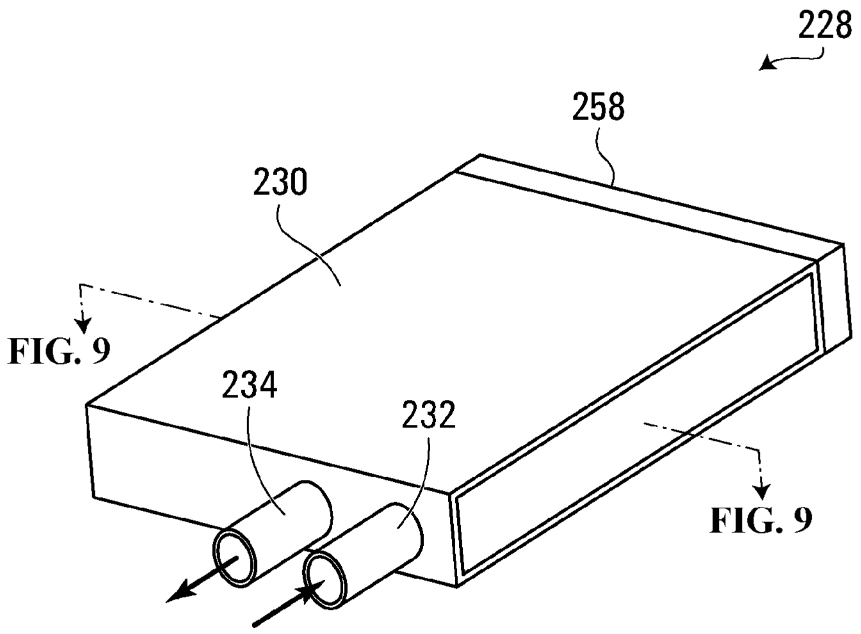
FIG. 8 is a perspective view of a fluid treatment apparatus according to another embodiment.
Figure 9:
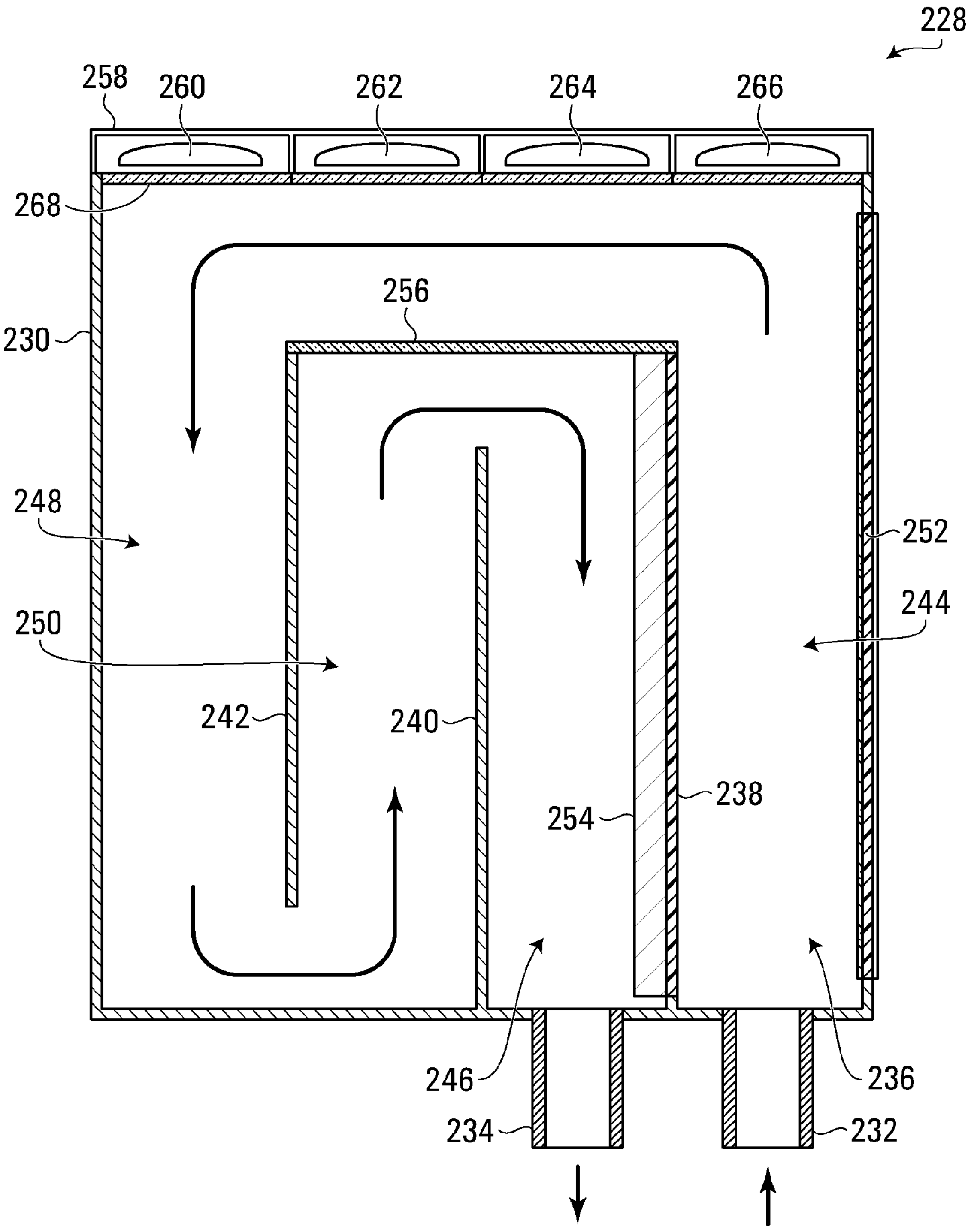
FIG. 9 is a cross-sectional view of the fluid treatment apparatus of FIG. 8, taken along the section line marked FIG. 9 in FIG. 8.

Referring to FIGS. 8 and 9, a fluid treatment apparatus according to another embodiment is shown generally at 228 and includes a photoelectrochemical reactor 230. The photoelectrochemical reactor 230 includes a fluid inlet 232 and a fluid outlet 234, both in fluid communication with a fluid chamber shown generally at 236. However, in the embodiment shown, the photochemical reactor 230 includes fluid chamber dividers 238, 240, 242, and 256, which separate the fluid chamber 236 into a cathode chamber shown generally at 244, an anode chamber shown generally at 246, a first UV radiation chamber shown generally at 248, and a second UV radiation chamber shown generally at 250.

In the embodiment shown, the fluid inlet 232 is in fluid communication with the cathode chamber 244, the cathode chamber 244 is in fluid communication with the first UV radiation chamber 248, the first UV radiation chamber 248 is in fluid communication with the second UV radiation chamber 250, the second UV radiation chamber 250 is in fluid communication with the anode chamber 246, and the anode chamber is in fluid communication with the fluid outlet 234, such that fluid that enters the photoelectrochemical reactor 230 from the fluid inlet 232 may flow from the fluid inlet 232 to the cathode chamber 244, then to the first UV radiation chamber 248, then to the second radiation chamber 250, and then to the anode chamber 246, and may then exit the photoelectrochemical reactor 230 through the fluid outlet 234. In other words, the first UV radiation chamber 248 and the second UV radiation chamber 250 are in a fluid flow path between the cathode chamber 244 and the anode chamber 246.

Fluid in the cathode chamber 244 may be exposed to a cathode of a cathode assembly 252, which may be the same as the cathode assembly 106 shown in FIGS. 1 and 2, and the cathode of the cathode assembly 252 faces into the cathode chamber 244. The cathode chamber 244 may thus be an electrochemical cell portion of the fluid chamber 236. Fluid in the anode chamber 246 may be exposed to an anode 254, which may be similar to the anode 108 shown in FIG. 2, and the anode 254 faces into the anode chamber 246. The anode chamber 246 may thus be an electrochemical cell portion of the fluid chamber 236. The fluid chamber divider 238, which separates the cathode chamber 244 from the adjacent anode chamber 246, may function as a selectively permeable membrane, similarly to the fluid chamber divider 188 shown in FIG. 7.

The photoelectrochemical reactor 230 includes a UV-LED housing 258 including UV-LED assemblies 260, 262, 264, and 266, which may be similar to the UV-LED assembly 126 as described above, or which may be other sources of radiation such as other photolyzing radiation, for example. The UV-LED housing 258 is separated from the fluid chamber 236 by a UV-transparent window 268. The UV-transparent window 268 may be a quartz window, for example. Furthermore, at least a portion of the fluid chamber divider 256 may also be composed of a UV-transparent material, such as quartz, for example. As a result of the UV-transparency of the UV-transparent window 268 and the fluid chamber divider 256, fluid in the cathode chamber 244 may be exposed to radiation from at least the UV-LED of the UV-LED assembly 266, fluid in the anode chamber 246 may be exposed to radiation from at least the UV-LED of the UV-LED assembly 264, fluid in the second UV radiation chamber may be exposed to radiation from at least the UV-LED of the UV-LED assembly 262, and fluid in the first UV radiation chamber may be exposed to radiation from at least the UV-LED of the UV-LED assembly 260.

In the embodiment shown, a principal radiation direction of UV radiation from the UV-LED of the UV-LED assembly 260 may be parallel to a main fluid flow direction of fluid in the first UV radiation chamber 248, a principal radiation direction of UV radiation from the UV-LED of the UV-LED assembly 262 may be parallel to a main fluid flow direction of fluid in the second UV radiation chamber 250, a principal radiation direction of UV radiation from the UV-LED of the UV-LED assembly 264 may be parallel to a main fluid flow direction of fluid in the anode chamber 246, and a principal radiation direction of UV radiation from the UV-LED of the UV-LED assembly 266 may be parallel to a main fluid flow direction of fluid in the cathode chamber 244, although alternative embodiments may differ.

At least a portion of the cathode chamber 244, the first UV radiation chamber 248, the second UV radiation chamber 250, and at least a portion of the anode chamber 246 are between the cathode of the cathode assembly 252 and the anode 254. In some embodiments, substantially all of the at least a portion of the cathode chamber 244, the first UV radiation chamber 248, the second UV radiation chamber 250, and the at least a portion of the anode chamber 246 between the cathode of the cathode assembly 252 and the anode 254 may be exposed to UV radiation from one or more of the UV-LED assemblies 260, 262, 264, and 266.

The fluid chamber dividers 240 and 242 may be made of or coated with a material having a high UV reflectivity, such that they may reflect into the fluid any part of the UV radiation that is emitted to them.

Figure 10:
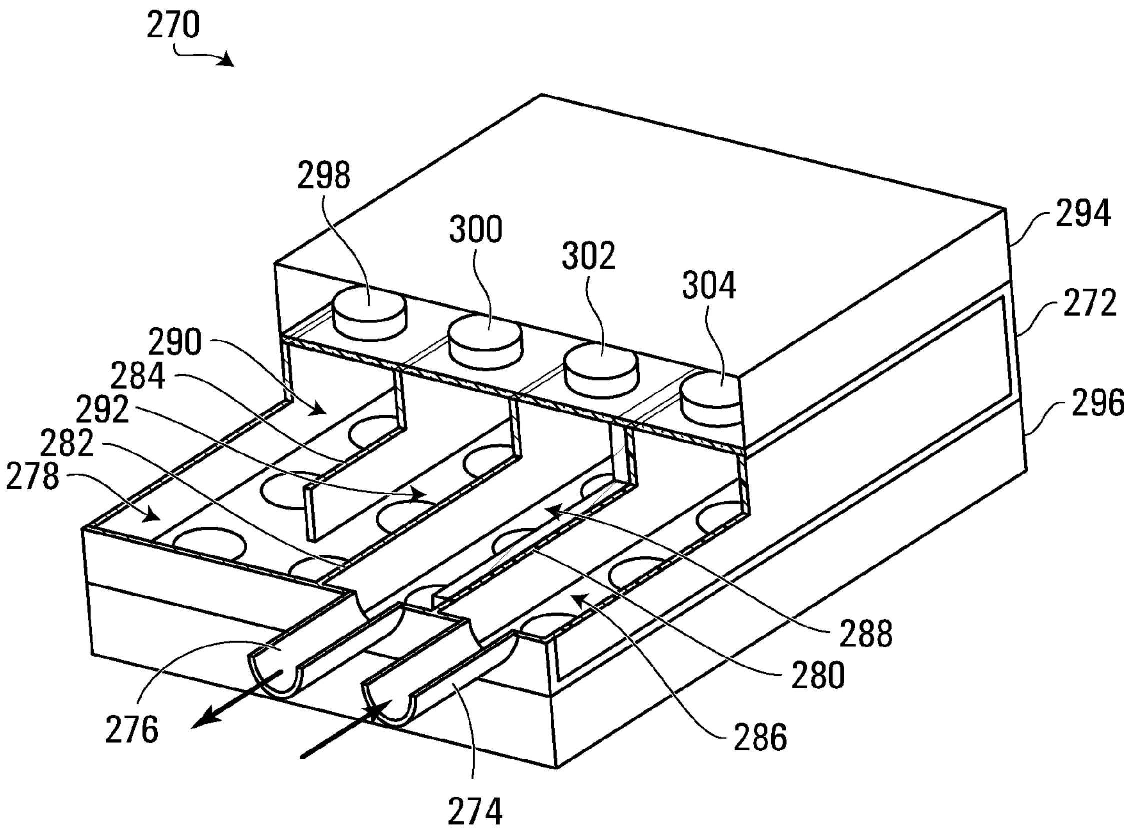
FIG. 10 is a cutaway perspective view of a fluid treatment apparatus according to another embodiment.
Figure 11:
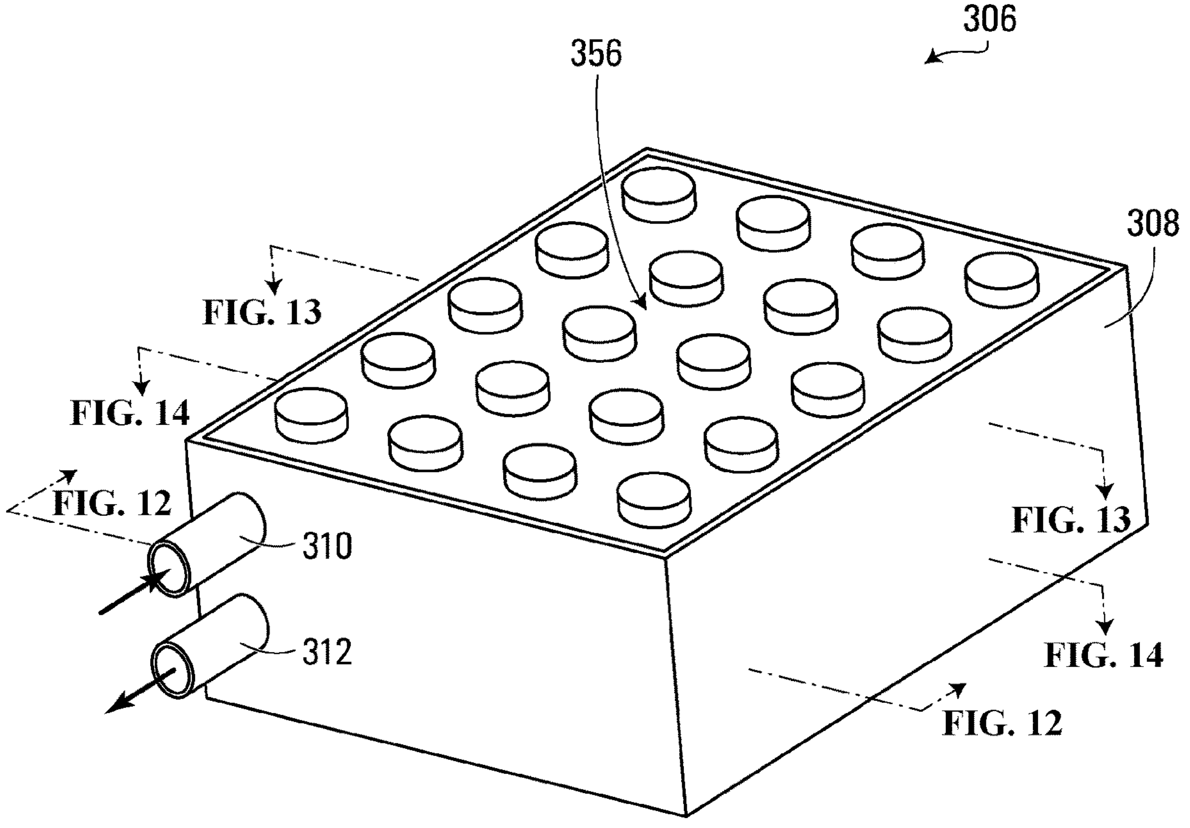
FIG. 11 is a perspective view of a fluid treatment apparatus according to another embodiment.
Figure 12:
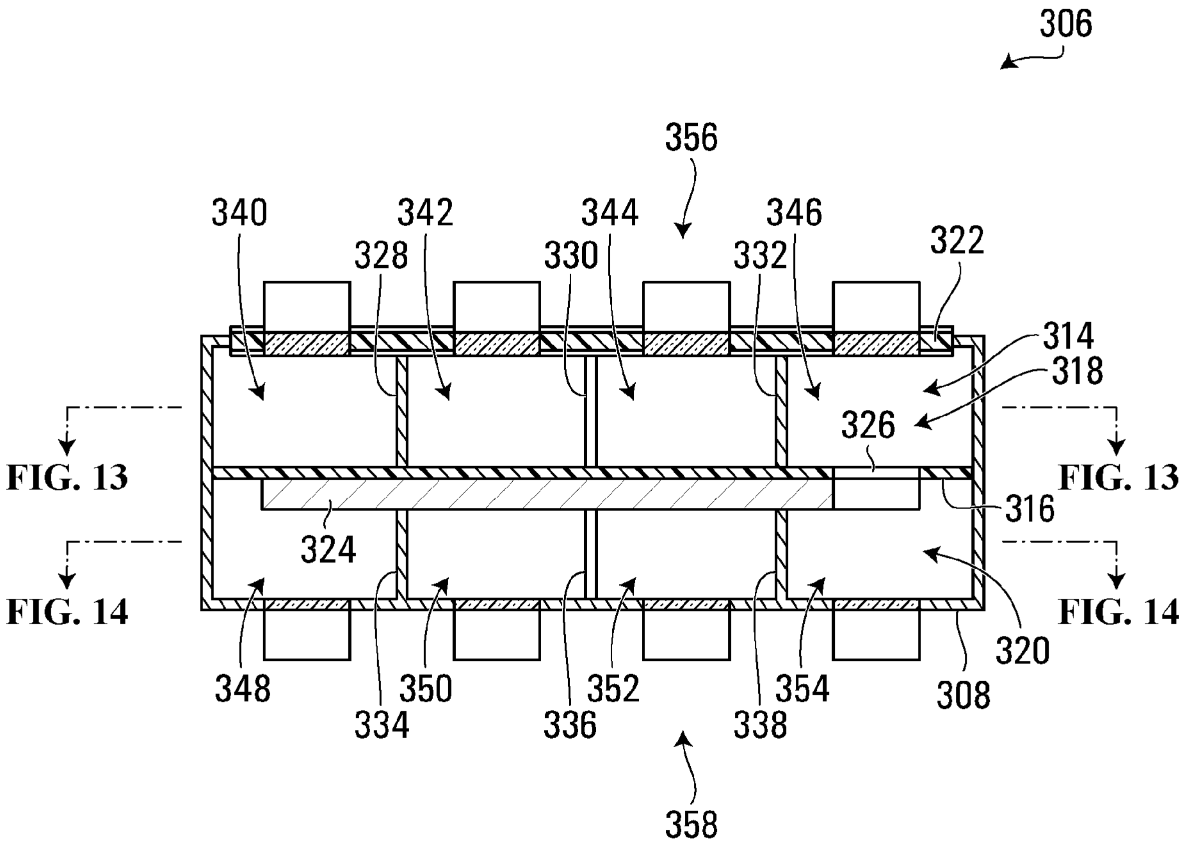
FIG. 12 is a cross-sectional view of the fluid treatment apparatus of FIG. 11, taken along the section lines marked FIG. 12 in FIGS. 11, 13, and 14.
Figure 13:
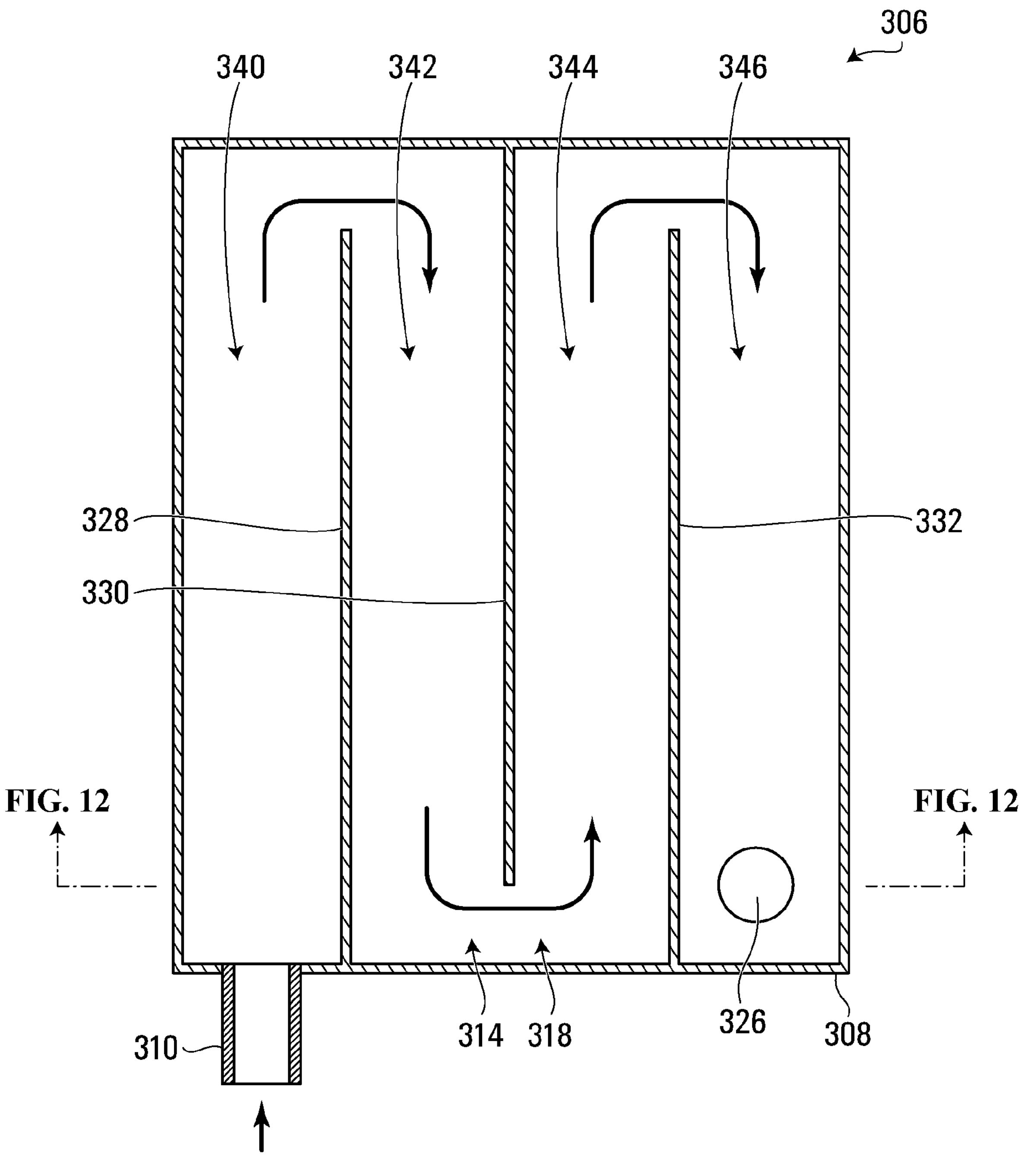
FIG. 13 is a cross-sectional view of the fluid treatment apparatus of FIG. 11, taken along the section lines marked FIG. 13 in FIGS. 11 and 12.
Figure 14:
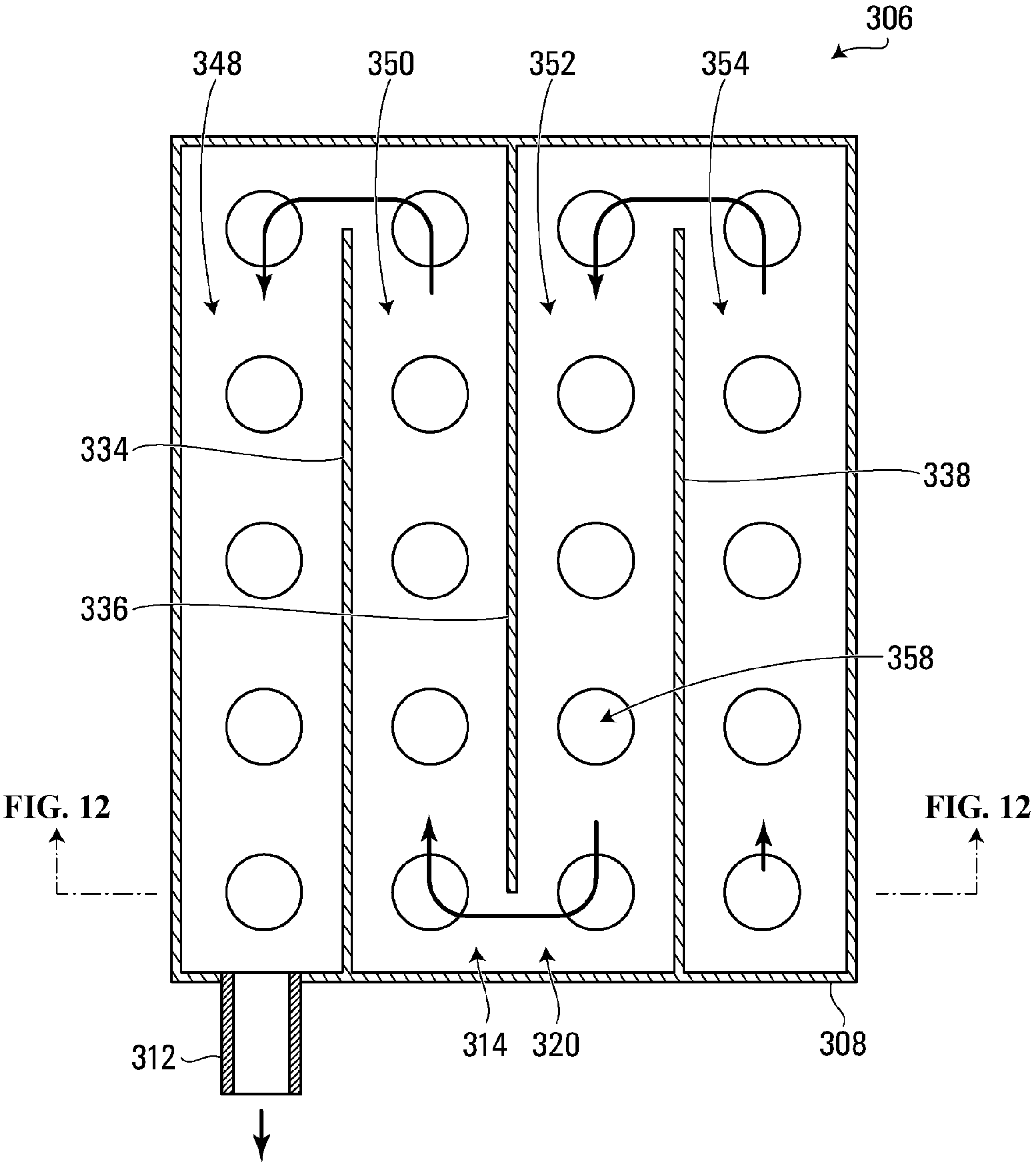
FIG. 14 is a cross-sectional view of the fluid treatment apparatus of FIG. 11, taken along the section lines marked FIG. 14 in FIGS. 11 and 12.
Figure 15:
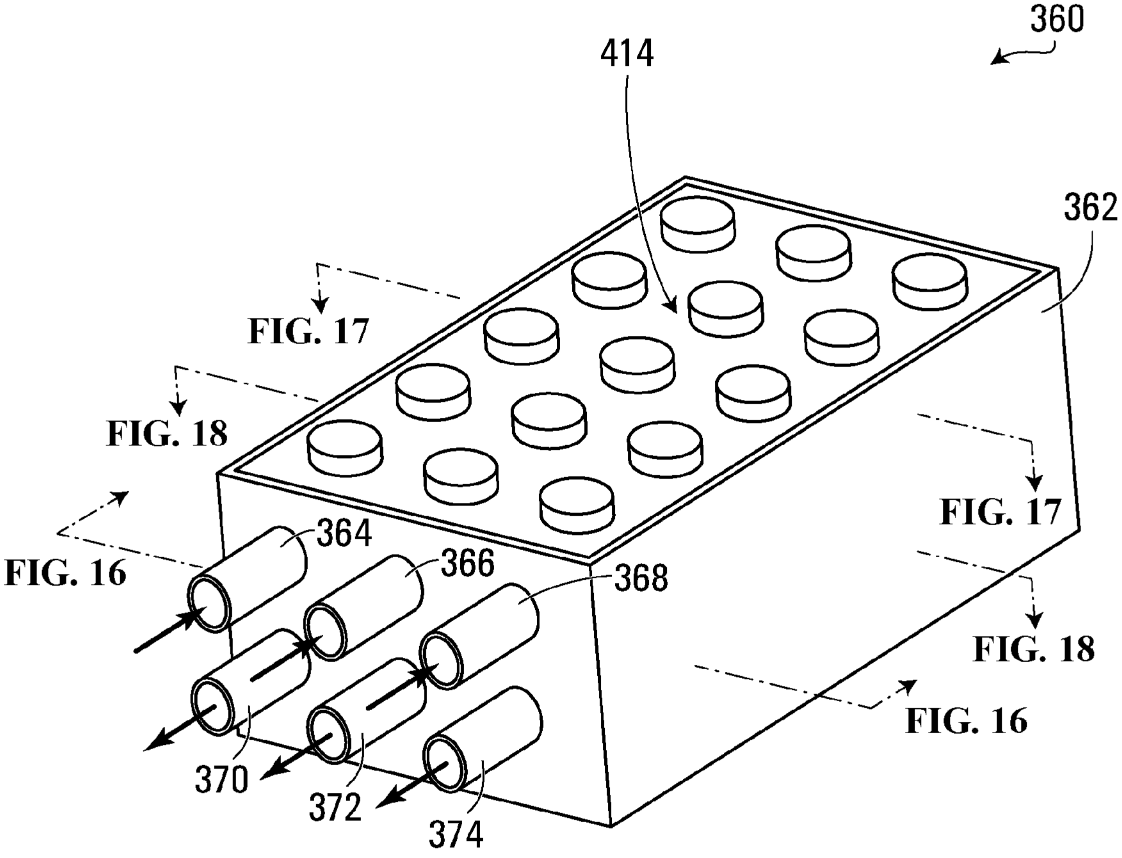
FIG. 15 is a perspective view of a fluid treatment apparatus according to another embodiment.
Figure 16:
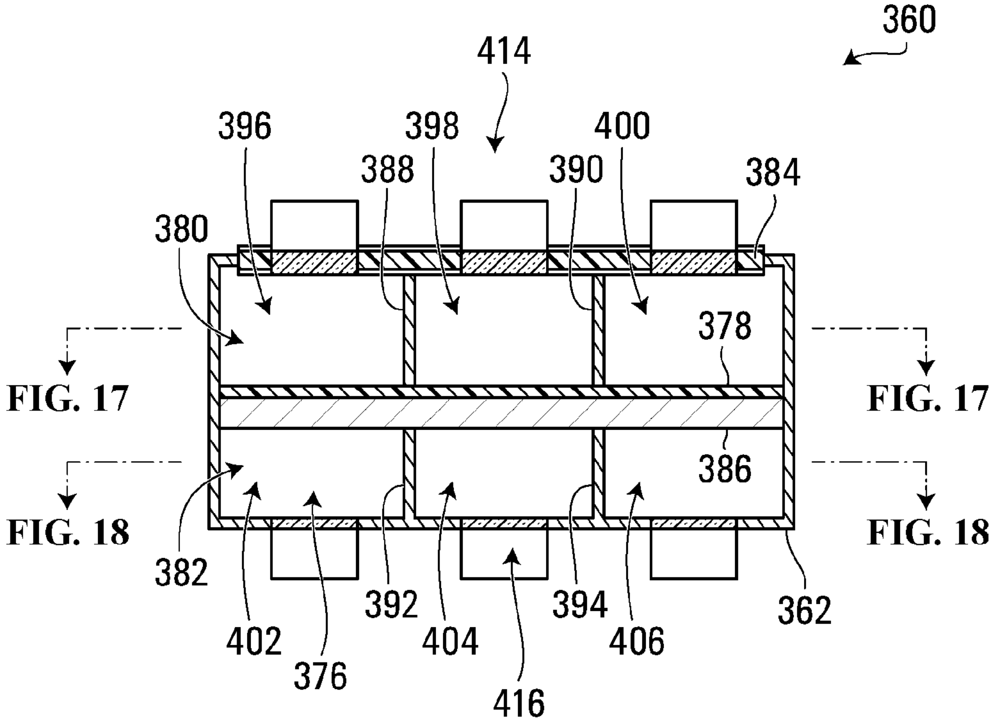
FIG. 16 is a cross-sectional view of the fluid treatment apparatus of FIG. 15, taken along the section lines marked FIG. 16 in FIGS. 15, 17, and 18.
Figure 17:
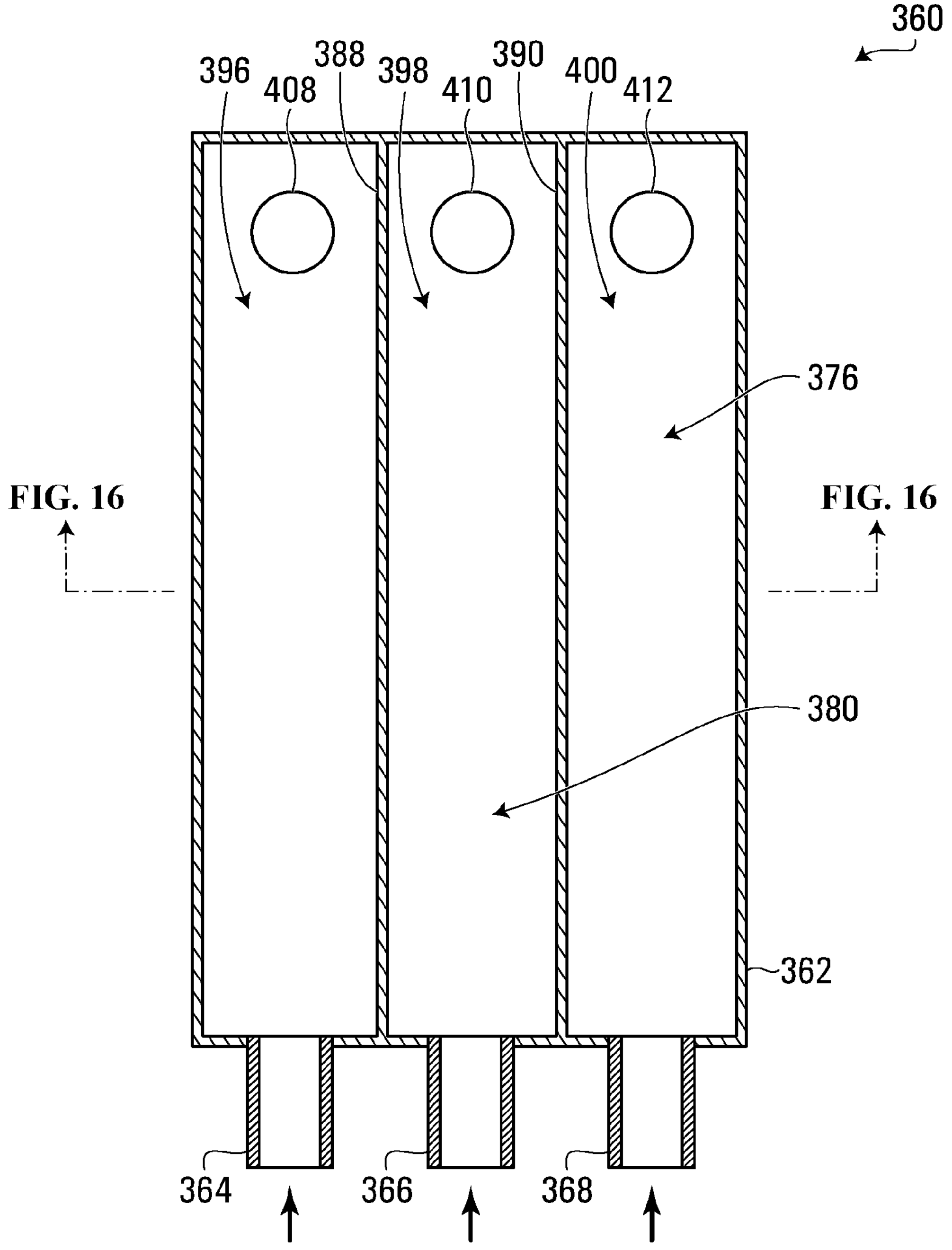
FIG. 17 is a cross-sectional view of the fluid treatment apparatus of FIG. 15, taken along the section lines marked FIG. 17 in FIGS. 15 and 16.
Figure 18:
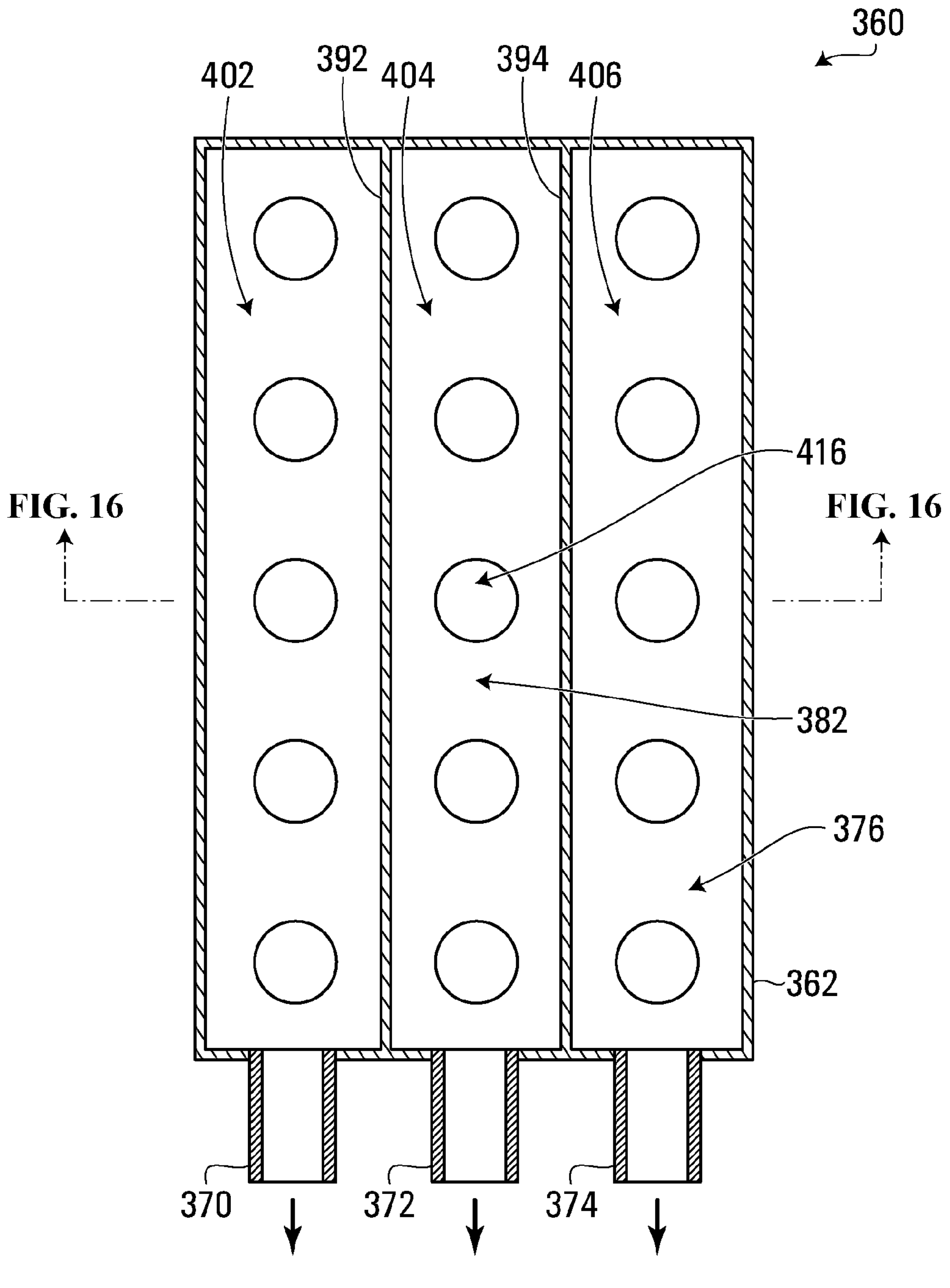
FIG. 18 is a cross-sectional view of the fluid treatment apparatus of FIG. 15, taken along the section lines marked FIG. 18 in FIGS. 15 and 16.

Referring to FIG. 10, a fluid treatment apparatus according to another embodiment is shown generally at 270 and includes a photoelectrochemical reactor 272. The photoelectrochemical reactor 272 includes a fluid inlet 274 and a fluid outlet 276, both in fluid communication with a fluid chamber shown generally at 278. The photoelectrochemical reactor 272 also includes fluid chamber dividers 280, 282, and 284, which separate the fluid chamber 278 into a cathode chamber shown generally at 286, an anode chamber shown generally at 288, a first UV radiation chamber shown generally at 290, and a second UV radiation chamber shown generally at 292. Generally, the photoelectrochemical reactor 272 may be similar to the photoelectrochemical reactor 230 shown in FIGS. 8 and 9, except that the photoelectrochemical reactor 272 has a first UV-LED housing 294 located on one side of (above, for example) the fluid chamber 278 and a second UV-LED housing 296 located on another side of (below, for example) the fluid chamber 278, whereas the photoelectrochemical reactor 230 shown in FIGS. 8 and 9 has only the single UV-LED housing 258 located on a side of the photoelectrochemical reactor 230 opposite the fluid inlet 232 and fluid outlet 234. Similar to the UV-LED housing 258 in FIGS. 8 and 9, each of the first UV-LED housing 294 and second UV-LED housing 296 may include multiple UV-LED assemblies. For example, the first UV-LED housing 294 includes at least UV-LED assemblies 298, 300, 302, and 304. In the embodiment shown, principal radiation directions of UV radiation from the UV-LEDs of the UV-LED assemblies of the first UV-LED housing 294 and of the second UV-LED housing 296 may be perpendicular to main fluid flow directions of fluid in the cathode chamber 286, in the anode chamber 288, in the first UV radiation chamber 290, and in the second UV radiation chamber 292.

Referring to FIGS. 11-14, a fluid treatment apparatus according to another embodiment is shown generally at 306 and includes a photoelectrochemical reactor 308. The photoelectrochemical reactor 308 includes a fluid inlet 310 and a fluid outlet 312, both in fluid communication with a fluid chamber shown generally at 314. The photoelectrochemical reactor 308 also includes a fluid chamber divider 316 separating the fluid chamber 314 into a cathode chamber shown generally at 318 and an anode chamber shown generally at 320. The fluid chamber divider 316 may function as a selectively permeable membrane, similarly to the fluid chamber divider 188 shown in FIG. 7. Fluid in the cathode chamber 318 may be exposed to a cathode of a cathode assembly 322, which may be the same as the cathode assembly 106 shown in FIGS. 1 and 2, and the cathode of the cathode assembly 322 faces into the cathode chamber 318. The cathode chamber 318 may thus be an electrochemical cell portion of the fluid chamber 314. Fluid in the anode chamber 320 may be exposed to an anode 324, which may be similar to the anode 108 shown in FIG. 2, and the anode 324 faces into the anode chamber 320. The anode chamber 320 may thus be an electrochemical cell portion of the fluid chamber 314.

However, in the embodiment shown, the cathode chamber 318 includes fluid flow channel dividers 328, 330, and 332, and the anode chamber 320 includes fluid flow channel dividers 334, 336, and 338. The fluid flow channel dividers 328, 330, and 332 in the cathode chamber 318 are shaped to cause the fluid in the cathode chamber 318 to flow through fluid flow channels shown generally at 340, 342, 344, and 346. The fluid flow channel dividers 334, 336, and 338 in the anode chamber 320 are shaped to cause the fluid in the anode chamber 320 to flow through fluid flow channels shown generally at 348, 350, 352, and 354.

Still referring to FIGS. 11-14, the fluid inlet 310 is in fluid communication with the fluid flow channel 340 of the cathode chamber 318, the fluid flow channel 340 of the cathode chamber 318 is in fluid communication with the fluid flow channel 342 of the cathode chamber 318, the fluid flow channel 342 of the cathode chamber 318 is in fluid communication with the fluid flow channel 344 of the cathode chamber 318, the fluid flow channel 344 of the cathode chamber 318 is in fluid communication with the fluid flow channel 346 of the cathode chamber 318, the fluid flow channel 346 of the cathode chamber 318 is in fluid communication with the fluid flow channel 354 of the anode chamber 320 through an opening 326 in the fluid chamber divider 316, the fluid flow channel 354 of the anode chamber 320 is in fluid communication with the fluid flow channel 352 of the anode chamber 320, the fluid flow channel 352 of the anode chamber 320 is in fluid communication with the fluid flow channel 350 of the anode chamber 320, the fluid flow channel 350 of the anode chamber 320 is in fluid communication with the fluid flow channel 348 of the anode chamber 320, and the fluid flow channel 348 of the anode chamber 320 is in fluid communication with the fluid outlet 312. As such, fluid that enters the photoelectrochemical reactor 308 from the fluid inlet 310 may flow from the fluid inlet 310 to the fluid flow channel 340 of the cathode chamber 318, then to the fluid flow channel 342 of the cathode chamber 318, then to the fluid flow channel 344 of the cathode chamber 318, then to the fluid flow channel 346 of the cathode chamber 318, then to the fluid flow channel 354 of the anode chamber 320, then to the fluid flow channel 352 of the anode chamber 320, then to the fluid flow channel 350 of the anode chamber 320, then to the fluid flow channel 348 of the anode chamber 320, and may then exit the photoelectrochemical reactor 308 through the fluid outlet 312. The fluid flow through the fluid flow channels 340, 342, 344, and 346 in the cathode chamber 318 and through the fluid flow channels 348, 350, 352, and 354 in the anode chamber 320 may be described as flow in series.

As shown in FIGS. 11-14, the photoelectrochemical reactor 308 includes at least UV-LED assembly arrays shown generally at 356 and 358. The UV-LED assembly arrays 356 and 358 may be similar to the UV-LED assembly array described in FIGS. 6 and 7. At least a portion of the cathode chamber 318 and at least a portion of the anode chamber 320 are between the cathode of the cathode assembly 322 and the anode 324. In some embodiments, substantially all of the at least a portion of the cathode chamber 318 and the at least a portion of the anode chamber 320 between the cathode of the cathode assembly 322 and the anode 324 may be exposed to UV radiation from one or more of the UV-LED assemblies of the UV-LED assembly arrays 356 and 358.

Referring to FIGS. 15-18, a fluid treatment apparatus according to another embodiment is shown generally at 360 and includes a photoelectrochemical reactor 362. The photoelectrochemical reactor 362 includes fluid inlets 364, 366, and 368, and fluid outlets 370, 372, and 374, all in fluid communication with a fluid chamber shown generally at 376. The photoelectrochemical reactor 362 also includes a fluid chamber divider 378 separating the fluid chamber 376 into a cathode chamber shown generally at 380 and an anode chamber shown generally at 382. The fluid chamber divider 378 may function as a selectively permeable membrane, similarly to the fluid chamber divider 188 shown in FIG. 7. Fluid in the cathode chamber 380 may be exposed to a cathode of a cathode assembly 384, which may be the same as the cathode assembly 106 shown in FIGS. 1 and 2, and the cathode of the cathode assembly 384 faces into the cathode chamber 380. The cathode chamber 380 may thus be an electrochemical cell portion of the fluid chamber 376. Fluid in the anode chamber 382 may be exposed to an anode 386, which may be similar to the anode 108 shown in FIG. 2, and the anode 386 faces into the anode chamber 382. The anode chamber 382 may thus be an electrochemical cell portion of the fluid chamber 376.

However, in the embodiment shown, the cathode chamber 380 includes fluid flow channel dividers 388 and 390, and the anode chamber 382 includes fluid flow channel dividers 392 and 394. The fluid flow channel dividers 388 and 390 in the cathode chamber 380 are shaped to cause the fluid in the cathode chamber 380 to flow through fluid flow channels shown generally at 396, 398, and 400. The fluid flow channel dividers 392 and 394 in the anode chamber 382 are shaped to cause the fluid in the anode chamber 382 to flow through fluid flow channels shown generally at 402, 404, and 406.

The fluid inlet 364 is in fluid communication with the fluid flow channel 396 of the cathode chamber 380, the fluid flow channel 396 of the cathode chamber 380 is in fluid communication with the fluid flow channel 402 of the anode chamber 382 through an opening 408 in the fluid chamber divider 378, and the fluid flow channel 402 of the anode chamber 382 is in fluid communication with the fluid outlet 370, such that fluid that enters photoelectrochemical reactor 362 from the fluid inlet 364 may flow from the fluid inlet 364 to the fluid flow channel 396 of the cathode chamber 380, and then to the fluid flow channel 402 of the anode chamber 382, and may then exit the photoelectrochemical reactor 362 through the fluid outlet 370. Similarly, the fluid inlet 366 is in fluid communication with the fluid flow channel 398 of the cathode chamber 380, the fluid flow channel 398 of the cathode chamber 380 is in fluid communication with the fluid flow channel 404 of the anode chamber 382 through an opening 410 in the fluid chamber divider 378, and the fluid flow channel 404 of the anode chamber 382 is in fluid communication with the fluid outlet 372, such that fluid that enters photoelectrochemical reactor 362 from the fluid inlet 366 may flow from the fluid inlet 366 to the fluid flow channel 398 of the cathode chamber 380, and then to the fluid flow channel 404 of the anode chamber 382, and may then exit the photoelectrochemical reactor 362 through the fluid outlet 372. Similarly, the fluid inlet 368 is in fluid communication with the fluid flow channel 400 of the cathode chamber 380, the fluid flow channel 400 of the cathode chamber 380 is in fluid communication with the fluid flow channel 406 of the anode chamber 382 through an opening 412 in the fluid chamber divider 378, and the fluid flow channel 406 of the anode chamber 382 is in fluid communication with the fluid outlet 374, such that fluid that enters photoelectrochemical reactor 362 from the fluid inlet 368 may flow from the fluid inlet 368 to the fluid flow channel 400 of the cathode chamber 380, and then to the fluid flow channel 406 of the anode chamber 382, and may then exit the photoelectrochemical reactor 362 through the fluid outlet 374. The fluid flow through the fluid flow channels 396, 398, and 400 in the cathode chamber 380 and through the fluid flow channels 402, 404, and 406 in the anode chamber 382 may be described as flow in parallel.

The photoelectrochemical reactor 362 includes at least UV-LED assembly arrays shown generally at 414 and 416. The UV-LED assembly arrays 414 and 416 may be similar to the UV-LED assembly array described in FIGS. 6 and 7. At least a portion of the cathode chamber 380 and at least a portion of the anode chamber 382 are between the cathode of the cathode assembly 384 and the anode 386. In some embodiments, substantially all of the at least a portion of the cathode chamber 380 and the at least a portion of the anode chamber 382 between the cathode of the cathode assembly 384 and the anode 386 may be exposed to UV radiation from one or more of the UV-LED assemblies of the UV-LED assembly arrays 414 and 416.

Although the embodiment of FIGS. 15-18 includes separate fluid inlets 364, 366, and 368 and separate fluid outlets 370, 372, and 374, alternative embodiments may vary and may include, for example, a single fluid inlet in fluid communication with the fluid flow channels 396, 398, and 400. As another example, alternative embodiments may include, for example, a single fluid outlet in fluid communication with the fluid flow channels 402, 404, and 406.

In some embodiments, a cross-section of a fluid chamber or fluid flow channels could be circular or other shapes. For example, referring to FIG. 19, a fluid treatment apparatus according to another embodiment is shown generally at 420 and includes a photoelectrochemical reactor 422. The photoelectrochemical reactor 422 includes a fluid inlet 424 and a fluid outlet 426, both in fluid communication with a fluid chamber shown generally at 428, such that fluid that enters the photoelectrochemical reactor 422 through the fluid inlet 424 may flow from the fluid inlet 424 through the fluid chamber 428, and out of the photoelectrochemical reactor 422 through the fluid outlet 426. The photoelectrochemical reactor 422 also includes a cathode assembly 430, an anode 432, and a UV-LED assembly 434. The cathode assembly 430 may be similar to the cathode assembly 106 shown in FIGS. 1 and 2 for example, and the anode 432 may be similar to the anode 108 shown in FIG. 2 for example.

When a fluid is in the fluid chamber 428, for example when flowing from the fluid inlet 424 to the fluid outlet 426, the fluid may be exposed to both a cathode of the cathode assembly 430 and the anode 432. At least a portion of the fluid chamber 428 is between the cathode of the cathode assembly 430 and the anode 432. In some embodiments, substantially all of the at least a portion of the fluid chamber 428 between the cathode of the cathode assembly 430 and the anode 432 may be exposed to UV radiation from the UV-LED assembly 434.

In the embodiment shown, the photoelectrochemical reactor 422 is generally cylindrical in shape, which may in some embodiments facilitate installation and integration into appliances, such as water and ice dispensing appliances, for example. In this embodiment, the anode 432 lines an internal generally cylindrical surface 433 of the photoelectrochemical reactor 432, while the cathode assembly 430 generally forms a disk at a generally circular base of the photoelectrochemical reactor 432, shown generally at 435, that is opposite the UV-LED assembly 434. A face fabric of the cathode assembly 430 may be exposed to an environment external to the photoelectrochemical reactor 422, such as atmospheric air or another source of oxygen, for example.

Figure 20:
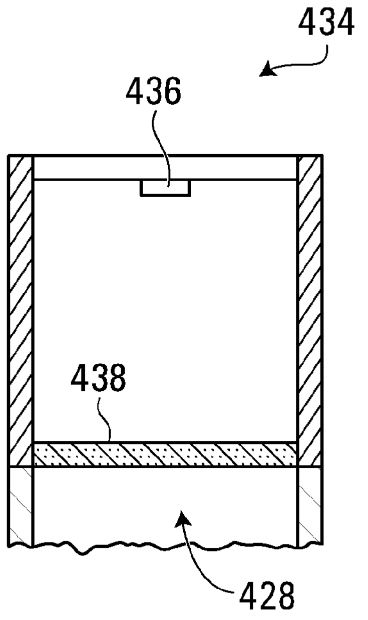
FIG. 20 is a cross-sectional view of a UV-LED assembly of the fluid treatment apparatus of FIG. 19, taken along the section line marked FIG. 20 in FIG. 19.

Referring to FIG. 20, the UV-LED assembly 434 is shown generally and includes a UV-LED 436 and a UV-transparent window 438, which separates the UV-LED assembly 434 from the fluid chamber 428. The UV-LED 436 may therefore emit UV radiation into the fluid chamber 428.

Figure 19:
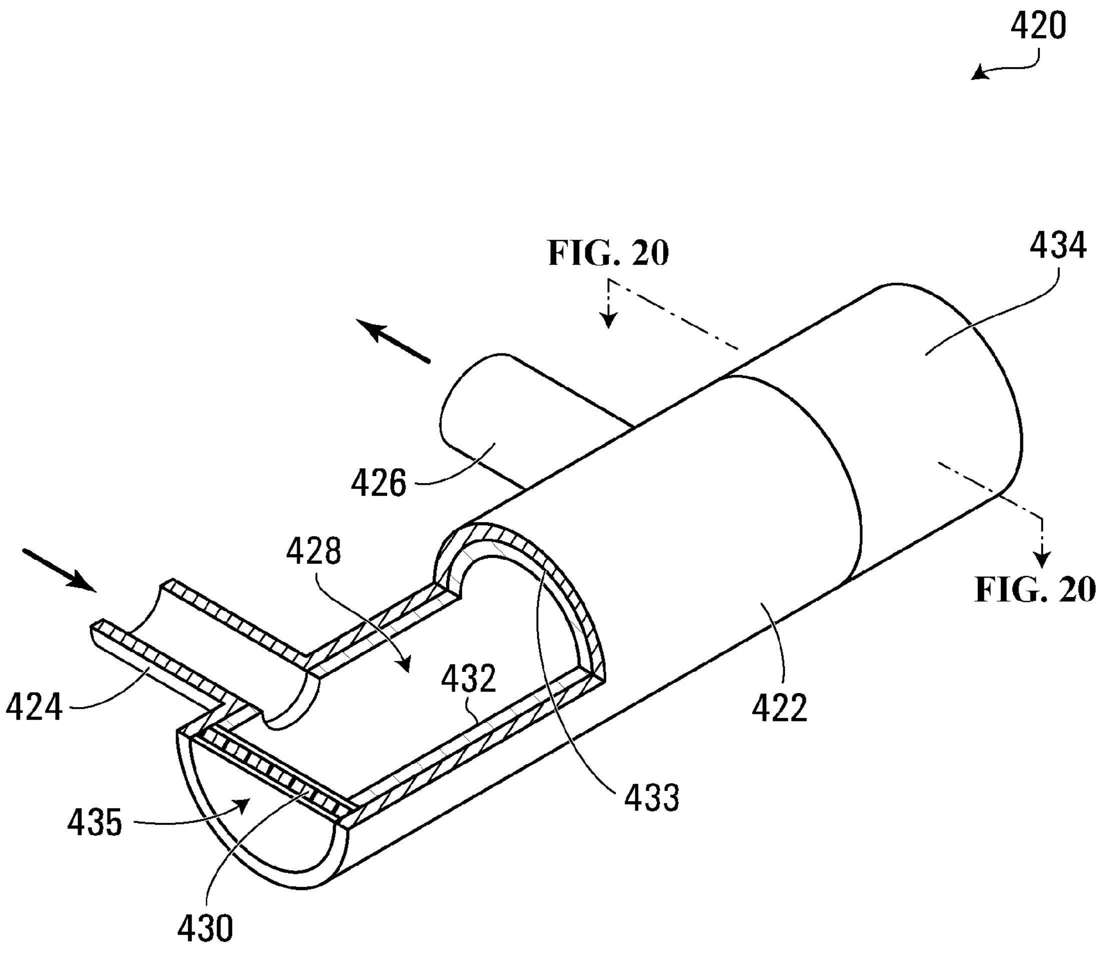
FIG. 19 is a cutaway perspective view of a fluid treatment apparatus according to another embodiment.

Of course, the embodiment of FIGS. 19 and 20 is an example only, and alternative embodiments may vary. For example, referring to FIG. 21, a UV-LED assembly shown generally at 440 is one alternative to the UV-LED assembly 434 and includes a UV-LED 442, a UV reflector 444 (which may be cup-shaped, parabolic, elliptical, or another shape), and a UV-transparent window 446, which separates the UV-LED assembly 440 from a fluid chamber shown generally at 448, which may be similar to the fluid chamber 428, for example. The UV-LED 442 may therefore emit UV radiation into the fluid chamber 448, including any UV radiation that may be reflected by the UV reflector 444 into the fluid chamber 448.

Figure 22:
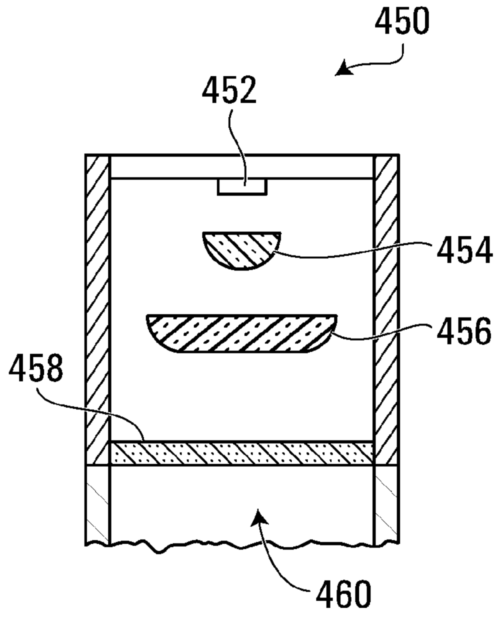
FIG. 22 is a cross-sectional view of a UV-LED assembly according to another embodiment.

As another example, referring to FIG. 22, a UV-LED assembly shown generally at 450 is another alternative to the UV-LED assembly 434 and includes a UV-LED 452, a first lens 454, a second lens 456, and a UV-transparent window 458, which separates the UV-LED assembly 450 from a fluid chamber shown generally at 460, which may be similar to the fluid chamber 428, for example. The UV-LED 452 may therefore emit UV radiation into the fluid chamber 460, including any UV radiation that may be refracted by the first lens 454 and by the second lens 456 into the fluid chamber 460. In the embodiment shown, the first lens 454 is a converging lens and positioned to converge UV radiation emitted from the UV-LED 452, and the second lens 456 is a collimating lens positioned to collimate UV radiation from the first lens 454. Therefore, the UV-LED assembly 450 is configured to cause collimated (or substantially collimated) UV radiation to be transmitted through the UV-transparent window 458 and into the fluid chamber 460.

Figure 23:
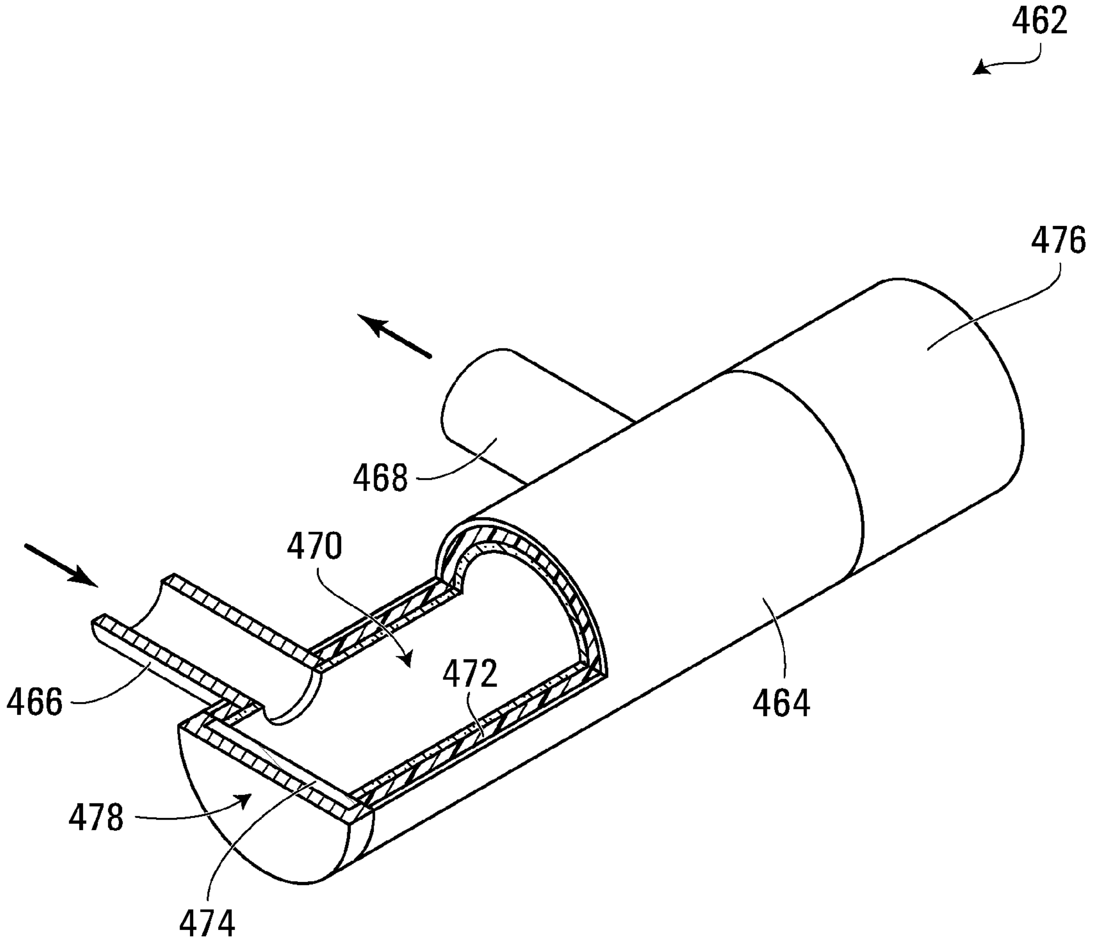
FIG. 23 is a cutaway perspective view of a fluid treatment apparatus according to another embodiment.

Photoelectrochemical reactors of alternative embodiments may differ in other ways from the photoelectrochemical reactor 422. For example, referring to FIG. 23, a fluid treatment apparatus according to another embodiment is shown generally at 462 and includes a photoelectrochemical reactor 464 that includes a fluid inlet 466 and a fluid outlet 468, both in fluid communication with a fluid chamber shown generally at 470.

The photoelectrochemical reactor 464 also includes a cathode assembly 472, an anode 474, and a UV-LED assembly 476. The cathode assembly 472 may be similar to the cathode assembly 106 shown in FIGS. 1 and 2, for example, but may have a generally cylindrical shape surrounding some or all of the fluid chamber 470. A face fabric of the cathode assembly 472 may be exposed to an environment external to the photoelectrochemical reactor 464, such as atmospheric air or another source of oxygen, for example. The anode 474 may be similar to the anode 108 shown in FIG. 2, for example, but may have a generally circular shape at a generally circular base of the photoelectrochemical reactor 464, shown generally at 478, that is opposite the UV-LED assembly 476. The UV-LED assembly 476 may be similar to the UV-LED assembly 434 shown in FIGS. 19 and 20, to the UV-LED assembly 440 shown in FIG. 21, or to the UV-LED assembly 450 shown in FIG. 22, for example. At least a portion of the fluid chamber 470 is between the cathode of the cathode assembly 472 and the anode 474. In some embodiments, substantially all of the at least a portion of the fluid chamber 470 between the cathode of the cathode assembly 472 and the anode 474 may be exposed to UV radiation from the UV-LED assembly 476.

Figure 24:
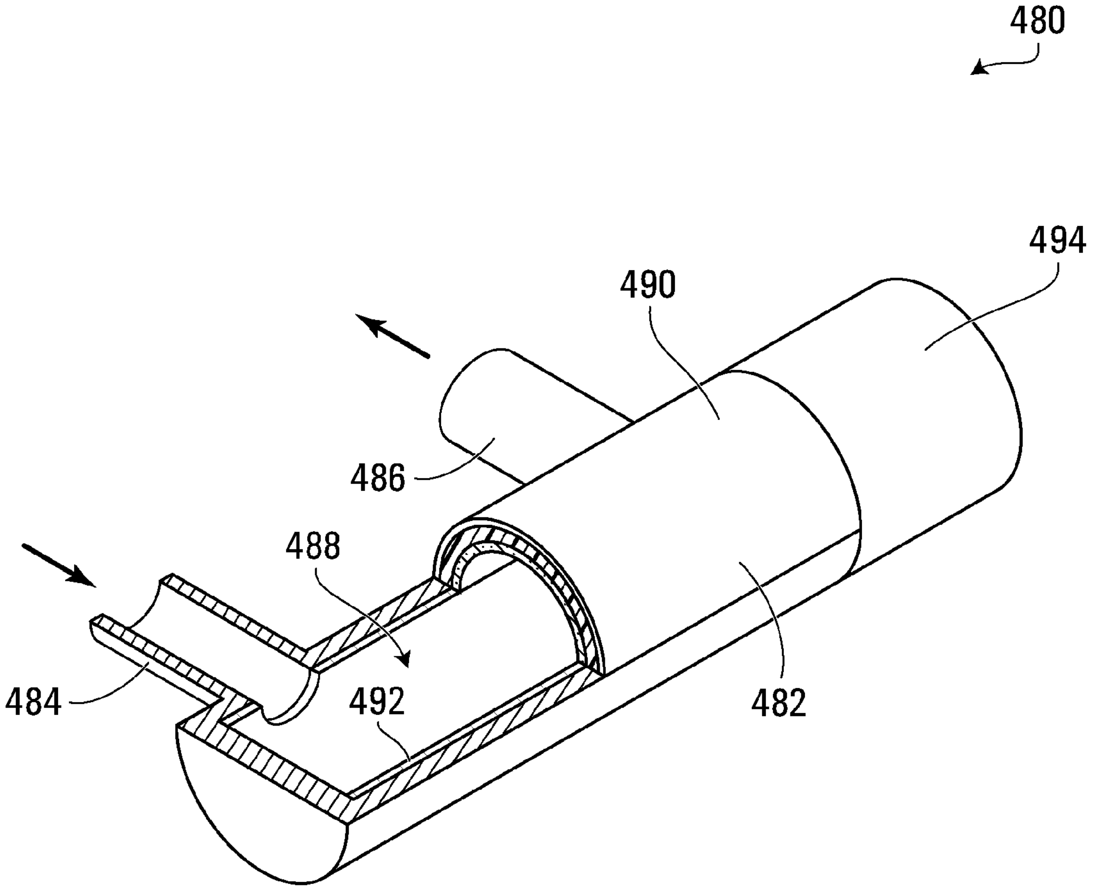
FIG. 24 is a cutaway perspective view of a fluid treatment apparatus according to another embodiment.

As another example, referring to FIG. 24, a fluid treatment apparatus according to another embodiment is shown generally at 480 and includes a photoelectrochemical reactor 482 that includes a fluid inlet 484 and a fluid outlet 486, both in fluid communication with a fluid chamber shown generally at 488.

The photoelectrochemical reactor 482 also includes a cathode assembly 490, an anode 492, and a UV-LED assembly 494. The cathode assembly 490 may be similar to the cathode assembly 106 shown in FIGS. 1 and 2, for example, but may have a generally semi-cylindrical shape surrounding some (for example one side, such as a top side or a top half) of the fluid chamber 488. A face fabric of the cathode assembly 490 may be exposed to an environment external to the photoelectrochemical reactor 482, such as atmospheric air or another source of oxygen, for example. The anode 492 may be similar to the anode 108 shown in FIG. 2, for example, but may have a generally semi-cylindrical shape surrounding some (for example one side, such as a bottom side opposite the top side or a bottom half opposite the top half) of the fluid chamber 488. The UV-LED assembly 494 may be similar to the UV-LED assembly 434 shown in FIGS. 19 and 20, to the UV-LED assembly 440 shown in FIG. 21, or to the UV-LED assembly 450 shown in FIG. 22, for example. At least a portion of the fluid chamber 488 is between the cathode of the cathode assembly 490 and the anode 492. In some embodiments, substantially all of the at least a portion of the fluid chamber 488 between the cathode of the cathode assembly 490 and the anode 492 may be exposed to UV radiation from the UV-LED assembly 494.

Figure 25:
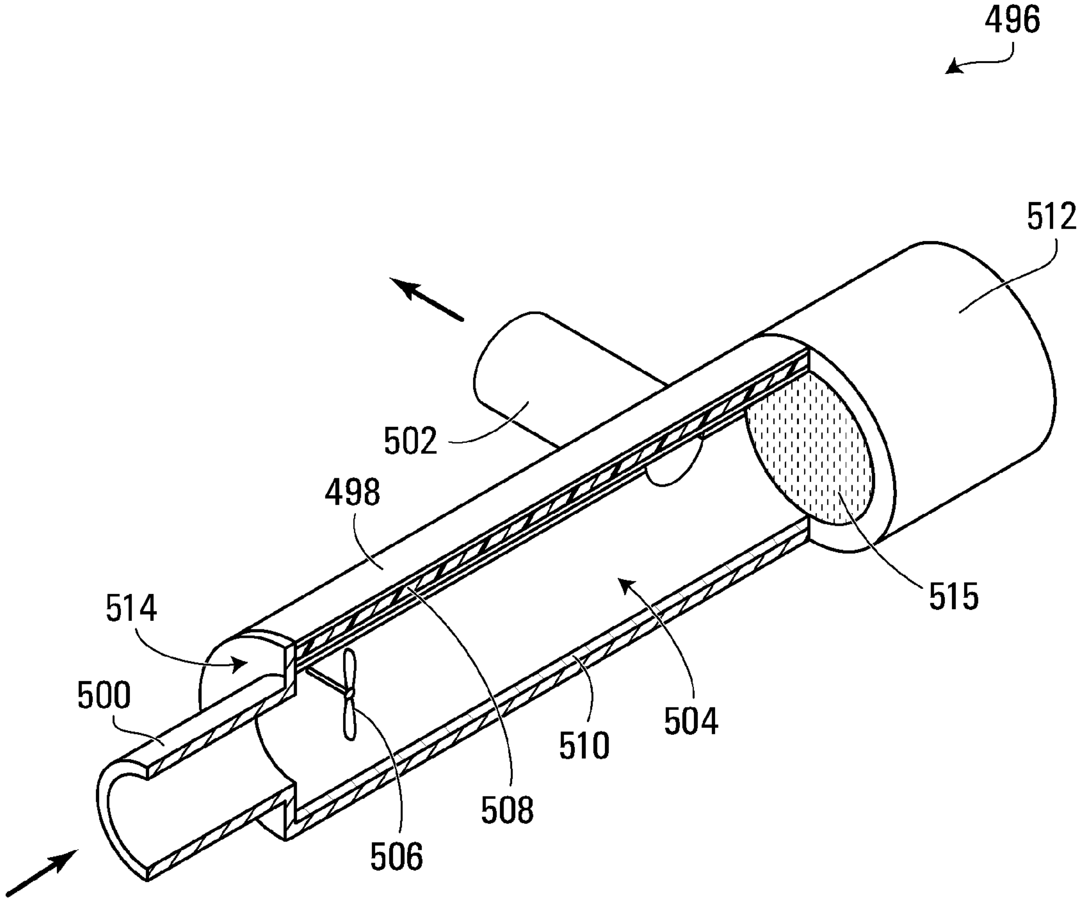
FIG. 25 is a cutaway perspective view of a fluid treatment apparatus according to another embodiment.

As another example, referring to FIG. 25, a fluid treatment apparatus according to another embodiment is shown generally at 496 and includes a photoelectrochemical reactor 498 that includes a fluid inlet 500 and a fluid outlet 502, both in fluid communication with a fluid chamber shown generally at 504. The photoelectrochemical reactor 498 also includes a mixer 506, a cathode assembly 508, an anode 510, and a UV-LED assembly 512.

The fluid inlet 500 is at a cylindrical base of the photoelectrochemical reactor 498, shown generally at 514, that is opposite the UV-LED assembly 512. The cathode assembly 508 may be similar to the cathode assembly 490 shown in FIG. 24, for example, and the anode 510 may be similar to the anode 492 shown in FIG. 24, for example. The UV-LED assembly 512 may be similar to the UV-LED assembly 434 shown in FIGS. 19 and 20, to the UV-LED assembly 440 shown in FIG. 21, or to the UV-LED assembly 450 shown in FIG. 22, for example, and may include a UV-transparent window 515 that may be similar to the UV-transparent window 438 shown in FIG. 20, to the UV-transparent window 446 shown in FIG. 21, or to the UV-transparent window 458 shown in FIG. 22, for example. At least a portion of the fluid chamber 504 is between the cathode of the cathode assembly 508 and the anode 510. In some embodiments, substantially all of the at least a portion of the fluid chamber 504 between the cathode of the cathode assembly 508 and the anode 510 may be exposed to UV radiation from the UV-LED assembly 512.

Figure 26:
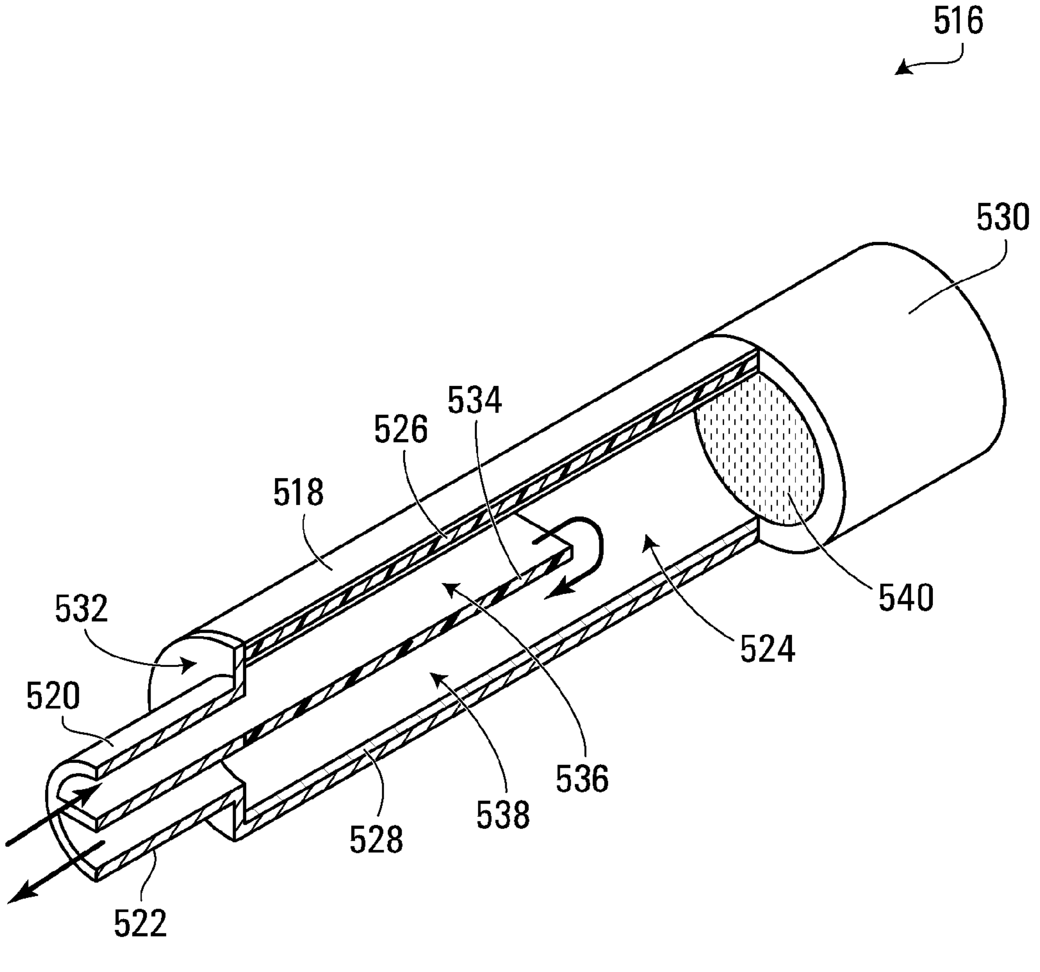
FIG. 26 is a cutaway perspective view of a fluid treatment apparatus according to another embodiment.

As another example, referring to FIG. 26, a fluid treatment apparatus according to another embodiment is shown generally at 516 and includes a photoelectrochemical reactor 518 that includes a fluid inlet 520 and a fluid outlet 522, both in fluid communication with a fluid chamber shown generally at 524. The photoelectrochemical reactor 518 also includes a cathode assembly 526, an anode 528, and a UV-LED assembly 530.

The fluid inlet 520 and the fluid outlet 522 are at a cylindrical base of the photoelectrochemical reactor 518, shown generally at 532, that is opposite the UV-LED assembly 530. The cathode assembly 526 may be similar to the cathode assembly 490 shown in FIG. 24, for example, and the anode 528 may be similar to the anode 492 shown in FIG. 24, for example.

However, the photoelectrochemical reactor 518 includes a fluid chamber divider 534 separating the fluid chamber 524 into a cathode chamber shown generally at 536 and an anode chamber shown generally at 538. The fluid inlet 520 is in fluid communication with the cathode chamber 536, the cathode chamber 536 is in fluid communication with the anode chamber 538, and the anode chamber 538 is in fluid communication with the fluid outlet 522, such that fluid that enters the photoelectrochemical reactor 518 from the fluid inlet 520 may flow from the fluid inlet 520 to the cathode chamber 538, and then to the anode chamber 538, and may then exit the photoelectrochemical reactor 518 through the fluid outlet 522. The cathode chamber 536 is adjacent the anode chamber 538. The fluid chamber divider 534 separates the cathode chamber 536 from the anode chamber 538 and may function as a selectively permeable membrane, similarly to the fluid chamber divider 188 shown in FIG. 7, for example.

Figure 21:
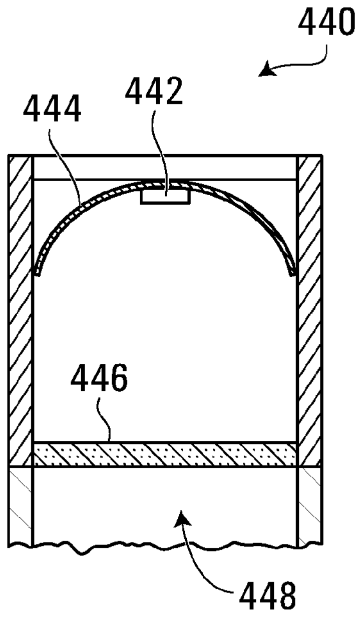
FIG. 21 is a cross-sectional view of a UV-LED assembly according to another embodiment.

The UV-LED assembly 530 may be similar to the UV-LED assembly 434 shown in FIGS. 19 and 20, to the UV-LED assembly 440 shown in FIG. 21, or to the UV-LED assembly 450 shown in FIG. 22, for example, and may include a UV-transparent window 540 that may be similar to the UV-transparent window 438 shown in FIG. 20, to the UV-transparent window 446 shown in FIG. 21, or to the UV-transparent window 458 shown in FIG. 22, for example. At least a portion of the fluid chamber 524 is between the cathode of the cathode assembly 526 and the anode 528. In some embodiments, substantially all of the at least a portion of the fluid chamber 524 between the cathode of the cathode assembly 526 and the anode 528 may be exposed to UV radiation from the UV-LED assembly 530.

Of course, the embodiments of FIGS. 1-26 are examples only, and alternative embodiments may vary. For example, alternative embodiments may include at least one UV radiation chamber (similar to the first and second UV radiation chambers 248 and 250 in FIGS. 8 and 9, for example) that contains fluid flow channel dividers (similar to the fluid flow channel dividers 328, 330, and 332 in FIGS. 12 and 13, for example) that may be shaped to cause the fluid in the UV radiation chamber to flow through fluid flow channels in the UV radiation chamber. Such fluid flow through the fluid flow channels in the UV radiation chamber may be in series or in parallel.

Further, alternative embodiments may include more than one cathode chamber, more than one anode chamber, or both, and alternative embodiments may include more than one cathode on the same or different surfaces defining a fluid chamber, more than one anode on the same or different surfaces defining a fluid chamber, or both. Also, alternative embodiments may include one or more UV-LED assemblies or one or more other sources of radiation in one or more different locations in a photoelectrochemical reactor. More generally, alternative embodiments may differ in shape from the embodiments described above and may and include more, fewer, or different fluid inlets, fluid outlets, fluid chambers, fluid flow channel dividers, fluid flow channels, cathodes, cathode assemblies, anodes, catalysts, dynamic or static mixers, radiation-reflecting bodies, radiation-reflecting surfaces, radiation-refracting bodies, radiation-transparent bodies, and other components.

Further, components such as those described above may be interchanged, varied, or removed. For example, the mixers or catalysts described above in some embodiments may be omitted, may be varied, or may be included in other embodiments.

Further, in the embodiments of FIGS. 6-18 and 26, the fluid inlets to the photoelectrochemical reactors are in fluid communication with a cathode chamber, and the fluid outlets to the photoelectrochemical reactors are in fluid communication with an anode chamber, such that the fluid flow direction in these embodiments is generally from the cathode to the anode. In alternative embodiments, however, a fluid inlet to a photoelectrochemical reactor may instead be in fluid communication with an anode chamber, and a fluid outlet to the photoelectrochemical reactor may instead be in fluid communication with a cathode chamber, such that the fluid flow direction would instead generally be from the anode to the cathode.

Additionally, in alternative embodiments, fluid flow through the photoelectrochemical reactor may be directed to transfer heat generated by electrical components of the reactor (for example, the UV-LED assemblies, the cathode, or the anode) away from such components. For example, the fluid may be circulated in the proximity of heat-generating electrical components. In such embodiments, the fluid flow may improve thermal regulation and management of the reactor.

In yet other alternative embodiments, filters may be added to fluid inlets or outlets of the photoelectrochemical reactor. Filters at the fluid inlets may remove some physical contaminants, such as particulates from the fluid before it enters the reactor. Filters at the fluid outlets may be used to remove any residual $H_2O_2$ from the fluid. The filters may include ion-exchange resins, for example.

This disclosure also includes embodiments according to the following non-limiting aspects.

1. A method of producing hydroxyl radicals in a fluid in a fluid chamber in an electrochemical cell comprising at least one cathode and at least one anode, the method comprising:
   - causing the electrochemical cell to produce hydrogen peroxide in the fluid; and
   - causing at least one photolyzing radiation source to emit photolyzing radiation into the fluid chamber in the electrochemical cell such that the photolyzing radiation reacts with the hydrogen peroxide to produce the hydroxyl radicals in the fluid.

2. The method of aspect 1 wherein the fluid comprises water.

3. The method of aspect 1 or 2 wherein causing the at least one photolyzing radiation source to emit the photolyzing radiation into the fluid chamber in the electrochemical cell comprises causing at least one radiation-reflecting body to reflect at least some of the photolyzing radiation into the fluid chamber in the electrochemical cell.

4. The method of aspect 3 wherein the at least one radiation-reflecting body comprises at least one cup-shaped reflector.

5. The method of aspect 4 wherein the at least one cup-shaped reflector comprises at least one parabolic reflector.

6. The method of aspect 4 wherein the at least one cup-shaped reflector comprises at least one elliptical reflector.

7. The method of any one of aspects 1-6 wherein causing the at least one photolyzing radiation source to emit the photolyzing radiation into the fluid chamber in the electrochemical cell comprises causing at least one radiation-refracting body to refract at least some of the photolyzing radiation into the fluid chamber in the electrochemical cell.

8. The method of aspect 7 wherein the at least one radiation-refracting body comprises at least one optical lens.

9. The method of aspect 8 wherein the at least one optical lens comprises a converging lens.

10. The method of aspect 8 or 9 wherein the at least one optical lens comprises a collimating lens.

11. The method of any one of aspects 1-10 wherein the fluid chamber in the electrochemical cell comprises a generally cylindrical portion terminating at a generally circular base.

12. The method of any one of aspects 1-11 wherein at least a portion of the cathode is curved to at least a portion of a generally cylindrical shape around at least a portion of the generally cylindrical portion of the fluid chamber in the electrochemical cell.

13. The method of any one of aspects 1-11 wherein at least a portion of the cathode is at the generally circular base of the fluid chamber in the electrochemical cell.

14. The method of any one of aspects 1-13 wherein at least a portion of the anode is curved to at least a portion of a generally cylindrical shape around at least a portion of the generally cylindrical portion of the fluid chamber in the electrochemical cell.

15. The method of any one of aspects 1-13 wherein at least a portion of the anode is at the generally circular base of the fluid chamber in the electrochemical cell.

16. The method of any one of aspects 1-15 wherein the at least one photolyzing radiation source comprises at least one ultraviolet (UV) radiation source, and wherein the photolyzing radiation comprises UV radiation.

17. The method of aspect 16 wherein the at least one UV radiation source comprises a first at least one solid-state UV emitter.

18. The method of aspect 17 wherein causing the at least one photolyzing radiation source to emit the photolyzing radiation into the fluid chamber in the electrochemical cell comprises causing a first at least one UV light-emitting diode (UV-LED) to emit UV radiation having a first peak wavelength into the fluid chamber in the electrochemical cell.

19. The method of aspect 18 wherein causing the at least one photolyzing radiation source to emit the photolyzing radiation into the fluid chamber in the electrochemical cell further comprises causing a second at least one UV-LED to emit UV radiation having a second peak wavelength into the fluid chamber in the electrochemical cell, the second peak wavelength different from the first peak wavelength.

20. The method of any one of aspects 1-19 wherein the at least one photolyzing radiation source is in a housing separated from the fluid by a window transparent to the photolyzing radiation.

21. The method of aspect 20 wherein the window comprises a quartz window.

22. The method of any one of aspects 1-21 further comprising causing the fluid to flow through the electrochemical cell.

23. The method of any one of aspects 1-22 wherein causing the at least one photolyzing radiation source to emit the photolyzing radiation into the fluid chamber in the electrochemical cell comprises causing the at least one photolyzing radiation source to expose at least a portion of the at least one cathode to the photolyzing radiation.

24. The method of any one of aspects 1-23 wherein causing the at least one photolyzing radiation source to emit the photolyzing radiation into the fluid chamber in the electrochemical cell comprises causing the at least one photolyzing radiation source to expose at least a portion of the at least one anode to the photolyzing radiation.

25. The method of any one of aspects 1-24 wherein the fluid flows through, at least, at least a portion of the fluid chamber between the at least one cathode and the at least one anode.

26. The method of aspect 25 wherein causing the at least one photolyzing radiation source to emit the photolyzing radiation into the fluid chamber in the electrochemical cell comprises causing the at least one photolyzing radiation source to emit the photolyzing radiation into, at least, substantially all of the at least a portion of the fluid chamber between the at least one cathode and the at least one anode.

27. The method of any one of aspects 1-24 wherein the fluid flows through, at least, at least a portion of the fluid chamber that is exposed to the at least one cathode and to the at least one anode.

28. The method of aspect 27 wherein causing the at least one photolyzing radiation source to emit the photolyzing radiation into the fluid chamber in the electrochemical cell comprises causing the at least one photolyzing radiation source to emit the photolyzing radiation into, at least, the at least a portion of the fluid chamber.

29. The method of any one of aspects 1-24 wherein the fluid flows through, at least, at least a portion of the fluid chamber, the at least one cathode and the at least one anode facing each other and into the at least a portion of the fluid chamber.

30. The method of aspect 29 wherein causing the at least one photolyzing radiation source to emit the photolyzing radiation into the fluid chamber in the electrochemical cell comprises causing the at least one photolyzing radiation source to emit the photolyzing radiation into, at least, the at least a portion of the fluid chamber.

31. The method of any one of aspects 1-28 wherein the fluid chamber in the electrochemical cell comprises:

a cathode chamber, the at least one cathode facing into the cathode chamber; and an anode chamber separated from the cathode chamber, the at least one anode facing into the anode chamber.

32. The method of aspect 31 wherein the anode chamber is in fluid communication with the cathode chamber.

33. The method of aspect 31 or 32 wherein the fluid flows from the cathode chamber to the anode chamber.

34. The method of aspect 31 or 32 wherein the fluid flows from the anode chamber to the cathode chamber.

35. The method of any one of aspects 31-34 wherein the cathode chamber comprises a plurality of cathode chamber fluid flow channels, each exposed to a respective at least one of the at least one cathode.

36. The method of aspect 35 wherein the fluid flows through the cathode chamber fluid flow channels in series.

37. The method of aspect 35 wherein the fluid flows through the cathode chamber fluid flow channels in parallel.

38. The method of any one of aspects 31-37 wherein the anode chamber comprises a plurality of anode chamber fluid flow channels, each exposed to a respective at least one of the at least one anode.

39. The method of aspect 38 wherein the fluid flows through the anode chamber fluid flow channels in series.

40. The method of aspect 38 wherein the fluid flows through the anode chamber fluid flow channels in parallel.

41. The method of any one of aspects 31-40 wherein causing the at least one photolyzing radiation source to emit the photolyzing radiation into the fluid chamber in the electrochemical cell comprises causing the at least one photolyzing radiation source to emit the photolyzing radiation into at least a portion of the cathode chamber.

42. The method of any one of aspects 31-41 wherein causing the at least one photolyzing radiation source to emit the photolyzing radiation into the fluid chamber in the electrochemical cell comprises causing the at least one photolyzing radiation source to emit the photolyzing radiation into at least a portion of the anode chamber.

43. The method of any one of aspects 31-42 wherein causing the at least one photolyzing radiation source to emit the photolyzing radiation into the electrochemical cell comprises causing the at least one photolyzing radiation source to emit the photolyzing radiation into, at least, a radiation chamber separated from but in fluid communication with the cathode chamber and the anode chamber.

44. The method of aspect 43 wherein the radiation chamber comprises a plurality of radiation chamber fluid flow channels.

45. The method of aspect 44 wherein the fluid flows through the radiation chamber fluid flow channels in series.

46. The method of aspect 44 wherein the fluid flows through the radiation chamber fluid flow channels in parallel.

47. The method of any one of aspects 43-46 wherein the radiation chamber is on a fluid flow path between the cathode chamber and the anode chamber.

48. The method of any one of aspects 31-47 wherein the cathode chamber and the anode chamber are adjacent to each other.

49. The method of aspect 48 wherein the electrochemical cell further comprises a membrane defining an interface between the cathode chamber and the anode chamber.

50. The method of aspect 49 wherein the membrane comprises a bipolar membrane.

51. The method of aspect 49 wherein the membrane comprises an ion exchange membrane.

52. The method of aspect 51 wherein the ion exchange membrane comprises a cation exchange membrane.

53. The method of aspect 52 wherein the cation exchange membrane comprises a proton exchange membrane.

54. The method of any one of aspects 31-53 wherein the electrochemical cell further comprises an ion-conductive material facilitating ion conduction between the cathode chamber and the anode chamber.

55. The method of aspect 54 wherein the ion-conductive material comprises an ion-conductive electrolyte.

56. The method of aspect 55 further comprising a salt bridge comprising the ion-conductive electrolyte.

57. The method of any one of aspects 1-56 wherein the at least one anode comprises at least one perforated electrode.

58. The method of aspect 57 wherein the at least one perforated electrode comprises at least one mesh electrode.

59. The method of aspect 57 or 58 wherein the at least one perforated electrode comprises at least one porous electrode.

60. The method of any one of aspects 1-59 wherein the at least one anode comprises at least one foam-structure electrode.

61. The method of any one of aspects 1-60 wherein the at least one anode comprises at least one metal-foam electrode.

62. The method of any one of aspects 1-61 wherein the at least one anode comprises at least one solid electrode.

63. The method of any one of aspects 1-62 wherein the at least one anode comprises a metal.

64. The method of any one of aspects 1-63 wherein the at least one anode comprises an alloy.

65. The method of any one of aspects 1-64 wherein the at least one anode comprises a metal oxide.

66. The method of aspect 65 wherein the at least one anode comprises titanium coated with the metal oxide.

67. The method of aspect 65 or 66 wherein the metal oxide is an iridium mixed-metal oxide.

68. The method of any one of aspects 1-67 wherein the at least one anode comprises a metal nitride.

69. The method of any one of aspects 1-68 wherein the at least one anode comprises a metal oxynitride.

70. The method of any one of aspects 1-69 wherein the electrochemical cell further comprises a cathode assembly comprising the at least one cathode.

71. The method of aspect 70 wherein the cathode assembly further comprises a support layer, and wherein the at least one cathode is on the support layer.

72. The method of aspect 71 wherein the at least one cathode is embedded in the support layer.

73. The method of aspect 71 or 72 wherein the at least one cathode is held on the support layer by chemical bonding.

74. The method of any one of aspects 71-73 wherein the at least one cathode has been laminated onto the support layer using a binder.

75. The method of any one of aspects 71-73 wherein the at least one cathode has been sprayed onto the support layer.

76. The method of any one of aspects 71-75 wherein the support layer is breathable.

77. The method of any one of aspects 71-76 wherein the support layer is made of at least one material impermeable to the fluid.

78. The method of aspect 77 wherein the support layer comprises a polymer.

79. The method of aspect 78 wherein the polymer comprises expanded polytetrafluoroethylene (ePTFE).

80. The method of any one of aspects 71-79 wherein:
- the cathode assembly comprises a first surface and a second surface opposite the first surface;
- the first surface is exposed to the fluid in the electrochemical cell; and
- the second surface is exposed to an environment external to the electrochemical cell.

81. The method of aspect 80 wherein the external environment comprises air.

82. The method of any one of aspects 71-81 wherein the cathode assembly further comprises a face fabric layer, and wherein the support layer is on the face fabric layer.

83. The method of aspect 82 wherein the face fabric layer comprises a nylon layer.

84. The method of aspect 82 or 83 wherein the face fabric layer comprises a polyester layer.

85. The method of any one of aspects 82-84 wherein the face fabric layer has a tensile strength of at least about 0.275 megapascals (MPa).

86. The method of any one of aspects 82-85 wherein the face fabric layer has a tensile strength of at least about 45 MPa.

87. The method of any one of aspects 1-86 wherein the at least one cathode comprises a cathodic catalyst.

88. The method of any one of aspects 1-87 wherein the at least one cathode comprises carbon black.

89. The method of any one of aspects 1-88 wherein the at least one cathode comprises carbon fiber paper.

90. The method of any one of aspects 1-89 wherein the at least one cathode comprises graphite.

91. The method of any one of aspects 1-90 wherein the at least one cathode comprises graphene.

92. The method of any one of aspects 1-91 wherein the at least one cathode comprises reduced graphene oxide (RGO).

93. The method of any one of aspects 1-92 wherein the at least one cathode comprises polytetrafluoroethylene (PTFE).

94. The method of any one of aspects 1-93 wherein the at least one cathode comprises a hydrophobic material.

95. The method of any one of aspects 1-94 wherein the electrochemical cell further comprises a photocatalyst in the fluid chamber.

96. The method of aspect 95 wherein the at least one photocatalyst is titanium dioxide.

97. The method of any one of aspects 1-96 wherein the electrochemical cell comprises a dynamic mixer in the fluid chamber.

98. The method of any one of aspects 1-97 wherein the electrochemical cell comprises a static mixer in the fluid chamber.

99. A cathode assembly for an electrochemical cell, the cathode assembly comprising:
- a support layer; and
- at least one cathode on the support layer.

100. The cathode assembly of aspect 99 wherein the at least one cathode is embedded in the support layer.

101. The cathode assembly of aspect 99 or 100 wherein the at least one cathode is held on the support layer by chemical bonding.

102. The cathode assembly of any one of aspects 99-101 wherein the at least one cathode has been laminated onto the support layer using a binder.

103. The cathode assembly of any one of aspects 99-101 wherein the at least one cathode has been sprayed onto the support layer.

104. The cathode assembly of any one of aspects 99-103 wherein the support layer is breathable.

105. The cathode assembly of any one of aspects 99-104 wherein the support layer is made of at least one waterproof material.

106. The cathode assembly of aspect 105 wherein the support layer comprises a polymer.

107. The cathode assembly of aspect 106 wherein the polymer comprises expanded polytetrafluoroethylene (ePTFE).

108. The cathode assembly of any one of aspects 99-107 further comprising a face fabric layer, wherein the support layer is on the face fabric layer.

109. The cathode assembly of aspect 108 wherein the face fabric layer comprises a nylon layer.

110. The cathode assembly of aspect 108 or 109 wherein the face fabric layer comprises a polyester layer.

111. The cathode assembly of any one of aspects 108-110 wherein the face fabric layer has a tensile strength of at least about 0.275 megapascals (MPa).

112. The cathode assembly of any one of aspects 108-111 wherein the face fabric layer has a tensile strength of at least about 45 MPa.

113. The cathode assembly of any one of aspects 99-112 wherein the at least one cathode comprises a cathodic catalyst.

114. The cathode assembly of any one of aspects 99-113 wherein the at least one cathode comprises carbon black.

115. The cathode assembly of any one of aspects 99-114 wherein the at least one cathode comprises carbon fiber paper.

116. The cathode assembly of any one of aspects 99-115 wherein the at least one cathode comprises graphite.

117. The cathode assembly of any one of aspects 99-116 wherein the at least one cathode comprises graphene.

118. The cathode assembly of any one of aspects 99-117 wherein the at least one cathode comprises reduced graphene oxide (RGO).

119. The cathode assembly of any one of aspects 99-118 wherein the at least one cathode comprises polytetrafluoroethylene (PTFE).

120. The cathode assembly of any one of aspects 99-119 wherein the at least one cathode comprises a hydrophobic material.

121. A fluid treatment apparatus comprising:

a structure defining a fluid chamber; and the cathode assembly of aspect 99, the at least one cathode facing into the fluid chamber.

122. A fluid treatment apparatus comprising:

a structure defining a fluid chamber;

at least one cathode facing into the fluid chamber;

at least one anode facing into the fluid chamber; and a photolyzing radiation source operable to emit photolyzing radiation into at least an electrochemical cell portion of the fluid chamber.

123. The apparatus of aspect 122 further comprising at least one radiation-reflecting body positioned to reflect at least some of the photolyzing radiation into the electrochemical cell portion of the fluid chamber when the photolyzing radiation source emits the photolyzing radiation.

124. The apparatus of aspect 123 wherein the at least one radiation-reflecting body comprises at least one cup-shaped reflector.

125. The apparatus of aspect 124 wherein the at least one cup-shaped reflector comprises at least one parabolic reflector.

126. The apparatus of aspect 124 wherein the at least one cup-shaped reflector comprises at least one elliptical reflector.

127. The apparatus of any one of aspects 122-126 further comprising at least one radiation-refracting body positioned to refract at least some of the photolyzing radiation into the electrochemical cell portion of the fluid chamber when the photolyzing radiation source emits the photolyzing radiation.

128. The apparatus of aspect 127 wherein the at least one radiation-refracting body comprises at least one optical lens.

129. The apparatus of aspect 128 wherein the at least one optical lens comprises a converging lens.

130. The apparatus of aspect 128 or 129 wherein the at least one optical lens comprises a collimating lens.

131. The apparatus of any one of aspects 122-130 wherein the electrochemical cell portion of the fluid chamber comprises a generally cylindrical portion terminating at a generally circular base.

132. The apparatus of any one of aspects 122-131 wherein at least a portion of the cathode is curved to at least a portion of a generally cylindrical shape around at least a portion of the generally cylindrical portion of the electrochemical cell portion of the fluid chamber.

133. The apparatus of any one of aspects 122-131 wherein at least a portion of the cathode is at the generally circular base of the electrochemical cell portion of the fluid chamber.

134. The apparatus of any one of aspects 122-133 wherein at least a portion of the anode is curved to at least a portion of a generally cylindrical shape around at least a portion of the generally cylindrical portion of the electrochemical cell portion of the fluid chamber.

135. The apparatus of any one of aspects 122-133 wherein at least a portion of the anode is at the generally circular base of the electrochemical cell portion of the fluid chamber.

136. The apparatus of any one of aspects 122-130 wherein the photolyzing radiation source comprises an ultraviolet (UV) radiation source, and wherein the photolyzing radiation comprises UV radiation.

137. The apparatus of aspect 131 wherein the UV radiation source comprises a first solid-state UV emitter.

138. The apparatus of aspect 137 wherein the first solid-state UV emitter comprises a first UV light-emitting diode (UV-LED), and wherein the first UV-LED is operable to emit UV radiation having a first peak wavelength.

139. The apparatus of aspect 138 wherein the UV radiation source further comprises a second UV-LED, and wherein the second UV-LED is operable to emit UV radiation having a second peak wavelength different from the first peak wavelength.

140. The apparatus of any one of aspects 122-139 further comprising:

a housing comprising the photolyzing radiation source; and a window transparent to the photolyzing radiation and separating the photolyzing radiation source from the fluid chamber.

141. The apparatus of aspect 140 wherein the window comprises a quartz window.

142. The apparatus of any one of aspects 122-141 wherein the photolyzing radiation source is positioned such that, when the photolyzing radiation source emits the photolyzing radiation, the photolyzing radiation source emits the photolyzing radiation onto, at least, at least a portion of the at least one cathode.

143. The apparatus of any one of aspects 122-142 the photolyzing radiation source is positioned such that, when the photolyzing radiation source emits the photolyzing radiation, the photolyzing radiation source emits the photolyzing radiation onto, at least, at least a portion of the at least one anode.

144. The apparatus of any one of aspects 122-143 wherein the photolyzing radiation source is positioned such that, when the photolyzing radiation source emits the photolyzing radiation, the photolyzing radiation source emits the photolyzing radiation into, at least, substantially all of at least a portion of the fluid chamber between the at least one cathode and the at least one anode.

145. The apparatus of any one of aspects 122-143 wherein at least a portion of the fluid chamber is exposed to the at least one cathode and to the at least one anode.

146. The apparatus of aspect 145 wherein the photolyzing radiation source is positioned such that, when the photolyzing radiation source emits the photolyzing radiation, the photolyzing radiation source emits the photolyzing radiation into, at least, the at least a portion of the fluid chamber.

147. The apparatus of any one of aspects 122-143 wherein the at least one cathode and the at least one anode face each other and into at least a portion of the fluid chamber.

148. The apparatus of aspect 147 wherein the photolyzing radiation source is positioned such that, when the photolyzing radiation source emits the photolyzing radiation, the photolyzing radiation source emits the photolyzing radiation into, at least, the at least a portion of the fluid chamber.

149. The apparatus of any one of aspects 122-146 wherein the fluid chamber comprises a cathode chamber and an anode chamber, the anode chamber separated from the cathode chamber, the at least one cathode facing into the cathode chamber, and the at least one anode facing into the anode chamber.

150. The apparatus of aspect 149 wherein the anode chamber is in fluid communication with the cathode chamber.

151. The apparatus of aspect 149 or 150 wherein the cathode chamber comprises a plurality of cathode chamber fluid flow channels, each exposed to a respective at least one of the at least one cathode.

152. The apparatus of aspect 151 wherein the cathode chamber has a shape that causes fluid flow through the cathode chamber fluid flow channels in series.

153. The apparatus of aspect 151 wherein the cathode chamber has a shape that causes fluid flow through the cathode chamber fluid flow channels in parallel.

154. The apparatus of any one of aspects 149-153 wherein the anode chamber comprises a plurality of anode chamber fluid flow channels, each exposed to a respective at least one of the at least one anode.

155. The apparatus of aspect 154 wherein the anode chamber has a shape that causes fluid flow through the anode chamber fluid flow channels in series.

156. The apparatus of aspect 154 wherein the anode chamber has a shape that causes fluid flow through the anode chamber fluid flow channels in parallel.

157. The apparatus of any one of aspects 149-156 wherein the photolyzing radiation source is positioned such that, when the photolyzing radiation source emits the photolyzing radiation, the photolyzing radiation source emits the photolyzing radiation into at least a portion of the cathode chamber.

158. The apparatus of any one of aspects 149-157 wherein the photolyzing radiation source is positioned such that, when the photolyzing radiation source emits the photolyzing radiation, the photolyzing radiation source emits the photolyzing radiation into at least a portion of the anode chamber.

159. The apparatus of any one of aspects 149-158 wherein the fluid chamber further comprises a radiation chamber separated from but in fluid communication with the cathode chamber and the anode chamber, wherein the photolyzing radiation source is positioned such that, when the photolyzing radiation source emits the photolyzing radiation, the photolyzing radiation source emits the photolyzing radiation into at least a portion of the radiation chamber.

160. The apparatus of aspect 159 wherein the radiation chamber comprises a plurality of radiation chamber fluid flow channels.

161. The apparatus of aspect 160 wherein the radiation chamber has a shape that causes fluid flow through the radiation chamber fluid flow channels in series.

162. The apparatus of aspect 160 wherein the radiation chamber has a shape that causes fluid flow through the radiation chamber fluid flow channels in parallel.

163. The apparatus of any one of aspects 159-162 wherein the radiation chamber is on a fluid flow path between the cathode chamber and the anode chamber.

164. The apparatus of any one of aspects 149-163 wherein the cathode chamber and the anode chamber are adjacent to each other.

165. The apparatus of aspect 164 further comprising a membrane defining an interface between the cathode chamber and the anode chamber.

166. The apparatus of aspect 165 wherein the membrane comprises a bipolar membrane.

167. The apparatus of aspect 165 wherein the membrane comprises an ion exchange membrane.

168. The apparatus of aspect 167 wherein the ion exchange membrane comprises a cation exchange membrane.

169. The apparatus of aspect 168 wherein the cation exchange membrane comprises a proton exchange membrane.

170. The apparatus of any one of aspects 122-169 further comprising an ion-conductive material facilitating ion conduction between the cathode chamber and the anode chamber.

171. The apparatus of aspect 170 wherein the ion-conductive material comprises an ion-conductive electrolyte.

172. The apparatus of aspect 171 further comprising a salt bridge comprising the ion-conductive electrolyte.

173. The apparatus of any one of aspects 122-172 wherein the at least one anode comprises at least one perforated electrode.

174. The apparatus of aspect 173 wherein the at least one perforated electrode comprises at least one mesh electrode.

175. The apparatus of aspect 173 or 174 wherein the at least one perforated electrode comprises at least one porous electrode.

176. The apparatus of any one of aspects 122-175 wherein the at least one anode comprises at least one foam-structure electrode.

177. The apparatus of any one of aspects 122-176 wherein the at least one anode comprises at least one metal-foam electrode.

178. The apparatus of any one of aspects 122-177 wherein the at least one anode comprises at least one solid electrode.

179. The apparatus of any one of aspects 122-178 wherein the at least one anode comprises a metal.

180. The apparatus of any one of aspects 122-179 wherein the at least one anode comprises an alloy.

181. The apparatus of any one of aspects 122-180 wherein the at least one anode comprises a metal oxide.

182. The apparatus of aspect 181 wherein the at least one anode comprises titanium coated with the metal oxide.

183. The apparatus of aspect 181 or 182 wherein the metal oxide is an iridium mixed-metal oxide.

184. The apparatus of any one of aspects 122-183 wherein the at least one anode comprises a metal nitride.

185. The apparatus of any one of aspects 122-184 wherein the at least one anode comprises a metal oxynitride.

186. The apparatus of any one of aspects 122-185 further comprising a cathode assembly comprising the at least one cathode.

187. The apparatus of aspect 186 wherein the cathode assembly further comprises a support layer, and wherein the at least one cathode is on the support layer.

188. The apparatus of aspect 121 or 187 wherein the at least one cathode is embedded in the support layer.

189. The apparatus of aspect 121, 187, or 188 wherein the at least one cathode is held on the support layer by chemical bonding.

190. The apparatus of aspect 121 or of any one of aspects 187-189 wherein the at least one cathode has been laminated onto the support layer using a binder.

191. The apparatus of aspect 121 or of any one of aspects 187-189 wherein the at least one cathode has been sprayed onto the support layer.

192. The apparatus of aspect 121 or of any one of aspects 187-191 wherein the support layer is breathable.

193. The apparatus of aspect 121 or of any one of aspects 187-192 wherein the support layer is made of at least one waterproof material.

194. The apparatus of aspect 193 wherein the support layer comprises a polymer.

195. The apparatus of aspect 194 wherein the polymer comprises expanded polytetrafluoroethylene (ePTFE).

196. The apparatus of aspect 121 or of any one of aspects 187-195 wherein:

the cathode assembly comprises a first surface and a second surface opposite the first surface;

the first surface faces into the fluid chamber; and the second surface is exposed to an environment external to the fluid chamber.

197. The apparatus of aspect 196 wherein the external environment comprises air.

198. The apparatus of aspect 121 or of any one of aspects 187-197 wherein the at least one cathode assembly further comprises a face fabric layer, and wherein the support layer is on the face fabric layer.

199. The apparatus of aspect 198 wherein the face fabric layer comprises a nylon layer.

200. The apparatus of aspect 198 or 199 wherein the face fabric layer comprises a polyester layer.

201. The apparatus of any one of aspects 198-200 wherein the face fabric layer has a tensile strength of at least about 0.275 megapascals (MPa).

202. The apparatus of any one of aspects 198-201 wherein the face fabric layer has a tensile strength of at least about 45 MPa.

203. The apparatus of any one of aspects 121-202 wherein the at least one cathode comprises a cathodic catalyst.

204. The apparatus of any one of aspects 121-203 wherein the at least one cathode comprises carbon black.

205. The apparatus of any one of aspects 121-204 wherein the at least one cathode comprises carbon fiber paper.

206. The apparatus of any one of aspects 121-205 wherein the at least one cathode comprises graphite.

207. The apparatus of any one of aspects 121-206 wherein the at least one cathode comprises graphene.

208. The apparatus of any one of aspects 121-207 wherein the at least one cathode comprises reduced graphene oxide (RGO).

209. The apparatus of any one of aspects 121-208 wherein the at least one cathode comprises polytetrafluoroethylene (PTFE).

210. The apparatus of any one of aspects 121-209 wherein the at least one cathode comprises a conductive hydrophobic material.

211. The apparatus of any one of aspects 121-210 further comprising at least one photocatalyst in the fluid chamber.

212. The apparatus of aspect 211 wherein the at least one photocatalyst is titanium dioxide.

213. The apparatus of any one of aspects 121-212 wherein the electrochemical cell comprises a dynamic mixer in the fluid chamber.

214. The apparatus of any one of aspects 121-213 further comprising a static mixer in the fluid chamber.

215. Use of the apparatus of any one of aspects 121-214 for treating a fluid.

216. The use of aspect 215 wherein the fluid comprises water.

In embodiments such as those described above, a single housing may include a fluid chamber, an anode, and a cathode, and photolyzing radiation (such as UV radiation, for example) may be directed into at least an electrochemical cell portion of the fluid chamber between the cathode and the anode. Further, in embodiments such as those described above, some or all of an anode, some or all of a cathode, or both may be exposed to such photolyzing radiation. Directing such photolyzing radiation into a single housing including a fluid chamber, an anode, and a cathode, directing such photolyzing radiation into such an electrochemical cell portion of a fluid chamber, or exposing some or all of an anode, some or all of a cathode, or both to such photolyzing radiation may, in some embodiments, allow ·OH radicals to be produced from $H_2O_2$ soon after the $H_2O_2$ is produced at one or more cathodes and before some or all the $H_2O_2$ reaches one or more anodes, which may produce ·OH radicals and treat fluids more effectively than other methods or apparatuses for producing ·OH radicals.

Although specific embodiments have been described and illustrated, such embodiments should be considered illustrative only and not as limiting the invention as construed according to the accompanying claims.

The invention claimed is:

1. A method of producing hydroxyl radicals in a fluid in a fluid chamber in an electrochemical cell comprising at least one cathode and at least one anode, the method comprising:

causing the electrochemical cell to produce hydrogen peroxide in the fluid, wherein the electrochemical cell comprises a cathode assembly comprising the at least one cathode, the cathode assembly further comprising a breathable support layer made of at least one material impermeable to the fluid that resists fluid flow across the support layer and wherein the at least one cathode is on the support layer;

diffusing a gas separate from the fluid through the support layer, the gas comprising oxygen; and causing at least one photolyzing radiation source to emit photolyzing radiation into the fluid chamber in the electrochemical cell such that the photolyzing radiation reacts with the hydrogen peroxide to produce the hydroxyl radicals in the fluid.

2. A fluid treatment apparatus comprising:

a structure defining a fluid chamber for treating a liquid;

at least one cathode facing into the fluid chamber;

at least one anode facing into the fluid chamber; and a photolyzing radiation source operable to emit photolyzing radiation into at least an electrochemical cell portion of the fluid chamber;

the fluid treatment apparatus further comprising:

a cathode assembly comprising the at least one cathode and a breathable support layer wherein the at least one cathode is on the breathable support layer, and wherein the support layer is made of at least one waterproof material that resists flow of the liquid across the support layer and permits a gas separate from the liquid to diffuse therethrough, the gas comprising oxygen;

wherein the cathode assembly is spaced apart from an inlet and an outlet of the fluid chamber.

3. The apparatus of claim 2 wherein the photolyzing radiation source comprises an ultraviolet (UV) radiation source, and wherein the photolyzing radiation comprises UV radiation.

4. The apparatus of claim 3 wherein the UV radiation source comprises a solid-state UV emitter.

5. The apparatus of claim 2 wherein the photolyzing radiation source is positioned such that, when the photolyzing radiation source emits the photolyzing radiation, the photolyzing radiation source emits the photolyzing radiation onto at least a portion of the at least one cathode.

6. The apparatus of claim 2 wherein the photolyzing radiation source is positioned such that, when the photolyzing radiation source emits the photolyzing radiation, the photolyzing radiation source emits the photolyzing radiation into at least a portion of the fluid chamber between the at least one cathode and the at least one anode.

7. The apparatus of claim 2 wherein the fluid chamber comprises a cathode chamber and an anode chamber, the anode chamber separated from the cathode chamber, the at least one cathode facing into the cathode chamber, and the at least one anode facing into the anode chamber.

8. The apparatus of claim 7 wherein the photolyzing radiation source is positioned such that, when the photolyzing radiation source emits the photolyzing radiation, the photolyzing radiation source emits the photolyzing radiation into at least a portion of the cathode chamber.

9. The apparatus of claim 7 wherein the photolyzing radiation source is positioned such that, when the photolyzing radiation source emits the photolyzing radiation, the photolyzing radiation source emits the photolyzing radiation into at least a portion of the anode chamber.

10. The apparatus of claim 7 wherein the fluid chamber further comprises a radiation chamber separated from but in fluid communication with the cathode chamber and the anode chamber, wherein the photolyzing radiation source is positioned such that, when the photolyzing radiation source emits the photolyzing radiation, the photolyzing radiation source emits the photolyzing radiation into at least a portion of the radiation chamber.

11. The apparatus of claim 7 further comprising an ion exchange membrane defining an interface between the cathode chamber and the anode chamber.

12. The apparatus of claim 2 wherein the support layer comprises a polymer.

13. The apparatus of claim 12 wherein the polymer comprises expanded polytetrafluoroethylene (ePTFE).

14. The apparatus of claim 2 wherein:

the cathode assembly comprises a first surface and a second surface opposite the first surface;

the first surface faces into the fluid chamber; and the second surface is exposed to an environment external to the fluid chamber.

15. The apparatus of claim 14 wherein the external environment comprises air.

16. The apparatus of claim 2 wherein the at least one cathode assembly further comprises a face fabric layer, and wherein the support layer is on the face fabric layer.

17. The apparatus of claim 16 wherein the face fabric layer comprises a nylon layer.

18. The apparatus of claim 16 wherein the face fabric layer has a tensile strength of at least about 0.275 megapascals.

19. The apparatus of claim 2 wherein the at least one cathode comprises a conductive hydrophobic material.

* * * * *